(12) United States Patent
Yamamoto

(10) Patent No.: US 10,456,847 B2
(45) Date of Patent: Oct. 29, 2019

(54) CUTTING TOOL AND METHOD FOR MANUFACTURING MACHINED PRODUCT

(71) Applicant: Kyocera Corporation, Kyoto-shi, Kyoto (JP)

(72) Inventor: Masahiro Yamamoto, Moriyama (JP)

(73) Assignee: Kyocera Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 15/546,593

(22) PCT Filed: Jan. 28, 2016

(86) PCT No.: PCT/JP2016/052494
§ 371 (c)(1),
(2) Date: Jul. 26, 2017

(87) PCT Pub. No.: WO2016/121870
PCT Pub. Date: Aug. 4, 2016

(65) Prior Publication Data
US 2018/0009045 A1 Jan. 11, 2018

(30) Foreign Application Priority Data
Jan. 29, 2015 (JP) .................. 2015-015762
Aug. 20, 2015 (JP) .................. 2015-162714

(51) Int. Cl.
*B23C 5/28* (2006.01)
*B23C 5/06* (2006.01)
*B23C 5/20* (2006.01)

(52) U.S. Cl.
CPC .................. *B23C 5/28* (2013.01); *B23C 5/06* (2013.01); *B23C 5/207* (2013.01);
(Continued)

(58) Field of Classification Search
CPC .. B23C 5/28; B23C 5/06; B23C 5/207; B23C 2210/246; B23C 2250/12
See application file for complete search history.

(56) References Cited

U.S. PATENT DOCUMENTS

2010/0272529 A1* 10/2010 Rozzi ..................... B23C 5/207
408/56

FOREIGN PATENT DOCUMENTS

| CN | 102427906 B | 11/2014 |
|---|---|---|
| JP | 08-039387 A | 2/1996 |
| JP | 2010-234457 A | 10/2010 |

OTHER PUBLICATIONS

International Search Report (Form PCT/ISA/210) issued for PCT/JP2016/052494, dated Feb. 23, 2016.
(Continued)

*Primary Examiner* — Alan Snyder
(74) *Attorney, Agent, or Firm* — Viering, Jentschura & Partner mbB

(57) ABSTRACT

In one embodiment, a cutting tool includes an insert that includes a cutting edge at at least one part of a portion where two surfaces intersect. The cutting tool further includes a holder capable of rotating about a rotational axis. The holder includes a pocket including: a placement portion where the insert is positioned; and a cutout portion is adjacent to the placement portion and positioned further forward in a rotational direction than the placement portion. The holder further includes an inflow port that opens at at least one part of the holder, a first flow path positioned in the interior of the holder, and an outflow port positioned at the pocket. The cutout portion includes a recessed portion.

18 Claims, 25 Drawing Sheets

(52) U.S. Cl.
CPC ............... *B23C 2200/0433* (2013.01); *B23C 2210/165* (2013.01); *B23C 2210/205* (2013.01); *B23C 2210/246* (2013.01); *B23C 2250/12* (2013.01)

(56) References Cited

OTHER PUBLICATIONS

Written Opinion (Form PCT/ISA/237) issued for PCT/JP2016/052494, dated Feb. 23, 2016.

* cited by examiner

United States Patent US 10,456,847 B2

CUTTING TOOL AND METHOD FOR MANUFACTURING MACHINED PRODUCT

TECHNICAL FIELD

The present embodiment relates to a cutting tool and to a method for manufacturing a machined product.

BACKGROUND ART

Cutting tools such as the milling cutter described in Japanese Unexamined Patent Application Publication No. H08-39387A (Patent Document 1) have been known as cutting tools used for machining workpieces such as metals. The milling cutter (cutting tool) described in Patent Document 1 is provided with a cutter main body (holder) that includes a tip pocket (pocket), and a throw-away tip (insert) mounted on a tip mounting seat of the tip pocket.

The milling cutter described in Patent Document 1 further includes a cutting fluid supply hole that is bored into the cutter main body and opens to the tip mounting seat, and a cutting fluid supply groove that is cut into the throw-away tip and communicates with the cutting fluid supply hole. A cutting edge of the throw-away tip is cooled by a cooling liquid (coolant) supplied via the cutting fluid supply hole and the cutting fluid supply groove.

SUMMARY OF INVENTION

In an embodiment, a cutting tool includes an insert and a holder. The insert includes a cutting edge at at least one part of a portion thereof where two surfaces intersect. The holder is capable of rotating about a rotational axis. The holder includes a pocket, an inflow port, a first flow path, and an outflow port. The pocket includes a placement portion and a cutout portion. The insert is positioned on the placement portion. The cutout portion is adjacent to the placement portion and is positioned further forward in the rotational direction than the placement portion. The inflow port opens at at least one part of the holder. The first flow path is positioned in the interior of the holder. The outflow port is positioned at the pocket. The cutout portion includes a recessed portion.

DESCRIPTION OF EMBODIMENTS

Figure 1:
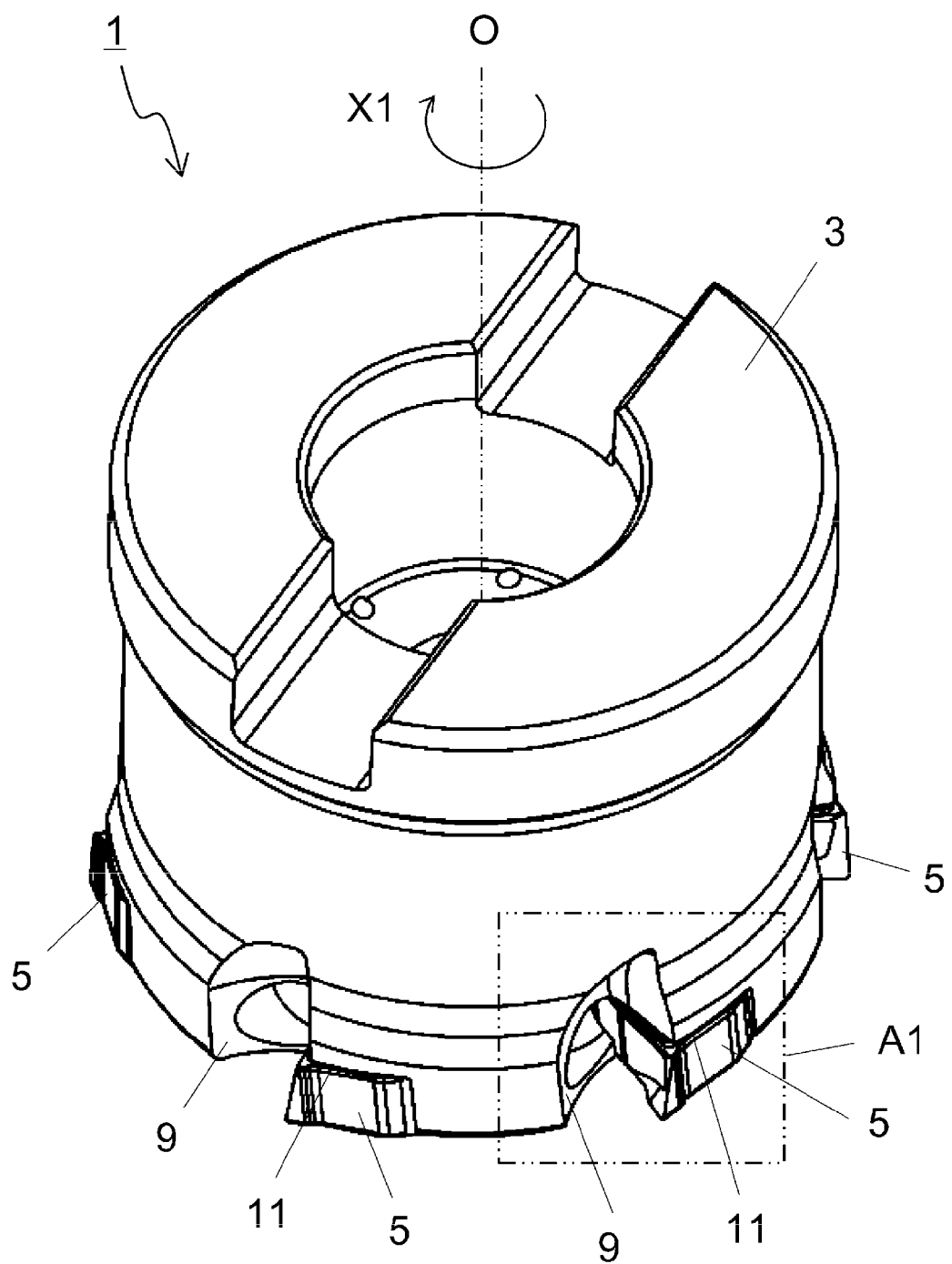
FIG. 1 is a perspective view illustrating a cutting tool of a first embodiment.

The following describes in detail a cutting tool of embodiments using the drawings. However, for convenience of explanation, each of the drawings referenced below is simplified to illustrate only the main members of the constituent members of the embodiments. Accordingly, the cutting tool of the present invention may include any constituent member which is not illustrated in each of the referenced drawings. Further, the dimensions of the members in the drawings do not faithfully represent the actual dimensions of the constituent members, the dimension ratios of the members, or the like.

A cutting tool 1 of a first embodiment illustrated in FIGS. 1 to 10 includes a holder 3 and a plurality of inserts 5. Further, the holder 3 includes an inflow port 6 that opens at at least one part of the holder 3, a first flow path 7 positioned in the interior of the holder 3, an outflow port 8, and one or more pockets 9.

The holder 3 has a rotational axis O. The holder 3 is a member that has a columnar body and, when a side where the inserts 5 are positioned is referred to as the front tip and a side opposite to the front tip 301 is referred to as the rear tip 302, extends from the front tip toward the rear tip along the rotational axis O. The holder 3 is capable of rotating about the rotational axis O and is configured to rotate in a rotational direction X1 during the machining of a workpiece for manufacturing a machined product. In the present embodiment, the central axis of the holder 3 being a columnar body and the rotational axis O of the holder 3 coincide.

Figure 3:
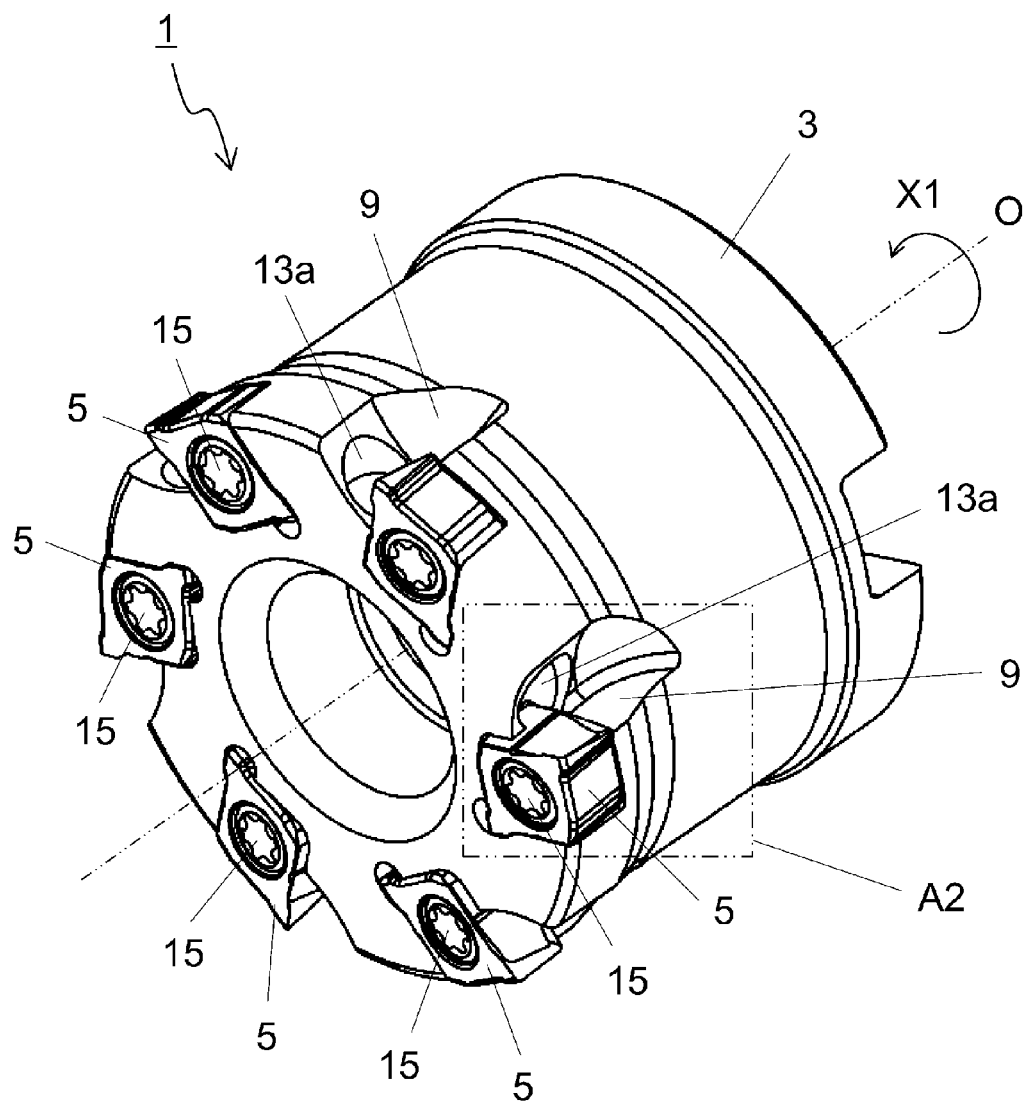
FIG. 3 is a perspective view of the cutting tool illustrated in FIG. 1 as viewed from a different direction.

In the following, a side near the rotational axis O is referred to as an inner periphery, and a side away from the rotational axis O is referred to as an outer periphery. Further, a direction from the rear tip toward the front tip of the holder 3 is referred to as a front tip direction, and a direction from the front tip toward the rear tip of the holder 3 is referred to as a rear tip direction. FIG. 1 is a perspective view of the cutting tool 1 as viewed from the rear tip. FIG. 3 is a perspective view of the cutting tool 1 as viewed from the front tip.

For the holder 3, steel, cast iron, aluminum alloy, or the like may be used. Of these materials, steel of high rigidity may be used in the cutting tool 1 of the present embodiment. The size of the holder 3 is selected suitably depending on the size of the workpiece. For example, the length along the rotational axis O can be set to about from 30 to 90 mm. Further, the width (diameter) in a direction orthogonal to the rotational axis O can be set to about from 20 to 500 mm.

Figure 2:
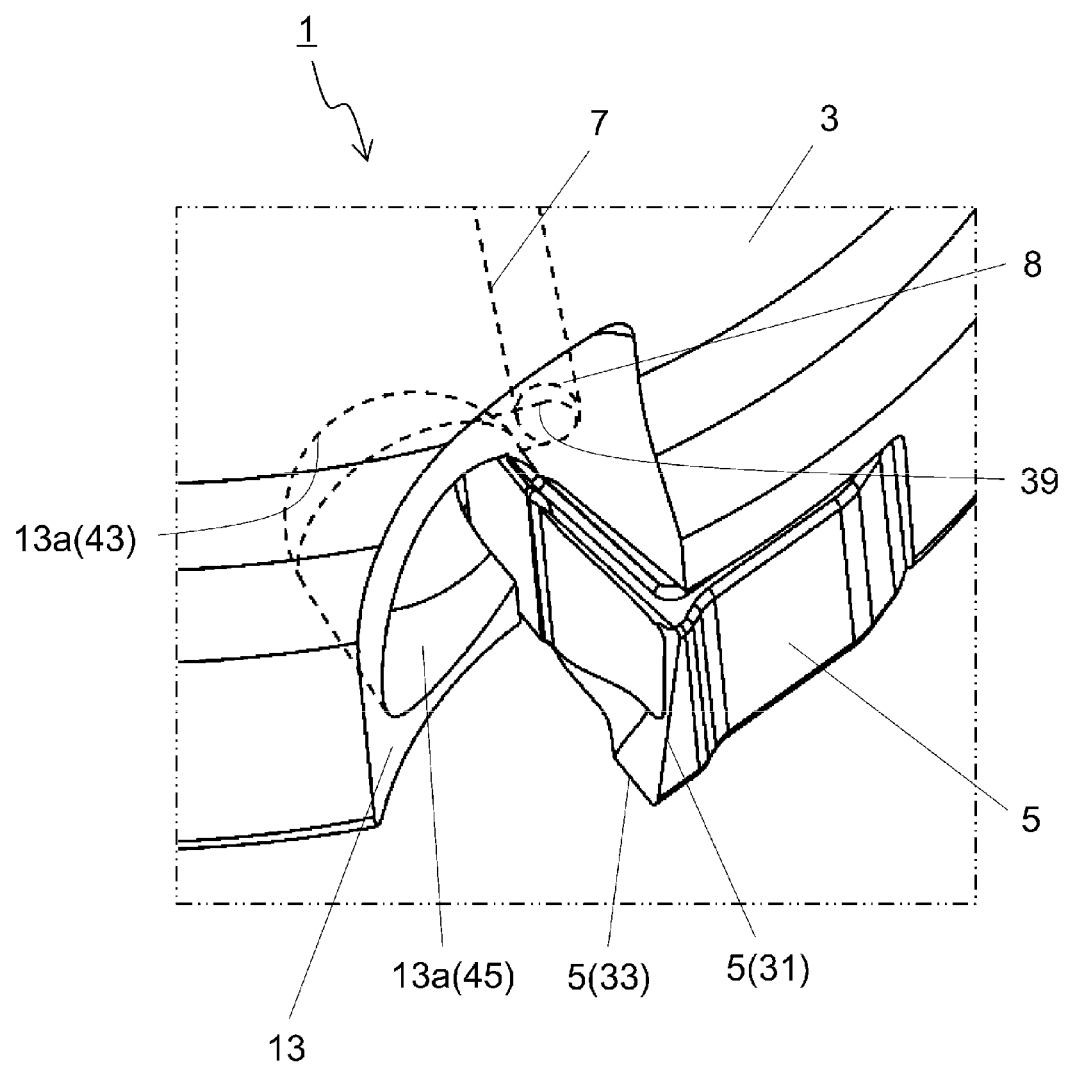
FIG. 2 is an enlarged view of a region A1 illustrated in FIG. 1.

A plurality of pockets 9 are positioned on the outer periphery of the front tip of the holder 3, as illustrated in FIG. 1. The pockets 9 of the present embodiment each include a placement portion 11 and a cutout portion 13, as illustrated in FIG. 2. The placement portion 11 is a section where the insert 5 is positioned, and opens at the outer periphery of the front tip of the holder 3 before the insert 5 is mounted. The cutout portion 13 is positioned further forward in the rotational direction X1 than the placement portion 11. While the holder 3 includes the plurality of pockets 9 in the present embodiment, the holder 3 may include one pocket 9.

The cutout portion 13 is used as a space for curling chips which the insert 5 produced. As a result, the cutout portion 13 is positioned further forward in the rotational direction X1 than the placement portion 11 where the insert 5 is placed. The cutout portion 13 opens at the outer periphery of the holder 3.

The cutout portion 13 of the present embodiment includes a recessed portion 13a. The recessed portion 13a is a shape obtained by further cutting out the cutout portion 13. The recessed portion 13a of the present embodiment opens rearward in the rotational direction X1 and outward from the holder 3.

The plurality of pockets 9 may be at equal intervals or unequal intervals, being rotationally symmetrical about the rotational axis O. To reduce variation in the load applied to the inserts 5 mounted to each of the pockets 9, the plurality of pockets 9 are preferably at equal intervals.

Since the plurality of pockets 9 is formed in the holder 3, it is clear that the shape of the holder 3 is not strictly columnar. The inserts 5 mounted on the pockets 9 are each fixed to the holder 3 by a screw 15.

In the present embodiment, an example is given in which six pockets 9 are provided to the holder 3, and the inserts 5 are respectively positioned in the six pockets 9, as illustrated in FIG. 3. Note that the number of pockets 9 and the number of inserts 5 mounted on the holder 3 are not limited to six. For example, two, three, four, five, eight, or ten or greater are fine with the numbers.

Each of the inserts 5 of the present embodiment is a quadrilateral columnar body, and includes an upper surface 17, a lower surface 19, and side surfaces, as illustrated in FIGS. 11 to 14. The upper surface 17 and the lower surface 19 each have a quadrilateral shape. When the insert 5 is mounted on the holder 3, the upper surface 17 is a surface that comes into contact with the placement surface 11 of the pocket 9 of the holder 3. Further, when the insert 1 is mounted on the holder 3, the lower surface 19 is a surface exposed at the front tip of the holder 3.

The side surfaces include four surface regions of a front side surface 21, a rear side surface 23, an outer side surface 25, and an inner side surface 27 corresponding to each side portion of the upper surface 17 and the lower surface 19 having the quadrilateral shapes. Note that, in the present embodiment, the four surface regions described above are conveniently named on the basis of FIG. 12 as well as the positional relationship when the inserts are mounted on the holder 3. These surface regions are each generally quadrilateral in shape when viewed from the front of the surface.

The front side surface 21 is a surface region positioned forward in the rotational direction X1 when the insert 5 is mounted on the holder 3. The front side surface 21 has a rectangular shape having a width and a height, the width being longer than the height where the width is a length of the rectangular in the direction orthogonal to the rotational axis O (or left-right direction in FIG. 13) and the height is a length in the direction along the rotational axis O (or up-down direction in FIG. 13) when viewed from the front thereof. The rear side surface 23 is a surface region positioned rearward in the rotational direction X1 when the insert 5 is mounted on the holder 3. The rear side surface 23 is positioned on the side opposite to the front side surface 21, and comes into contact with the placement portion 11 when the insert 5 is mounted on the holder 3.

The outer side surface 25 is a surface region positioned on the outer periphery when the insert 5 is mounted on the holder 3. Further, the outer side surface 25 protrudes further in the outer peripheral direction than the holder 3 when the insert 5 is mounted on the holder 3. Note that, while the overall outer side surface 25 protrudes further in the outer peripheral direction than the holder 3 in the present embodiment, the outer side surface 25 is not limited to such a mode. For example, a part of the outer side surface 25 near to the front side surface 21 may protrude further in the outer peripheral direction than the holder 3.

The inner side surface 27 is a surface region positioned on the inner periphery when the insert 5 is mounted on the holder 3, and comes into contact with the placement portion 11 when the insert 5 is mounted on the holder 3.

Each of the four surface regions of the front side surface 21, the rear side surface 23, the outer side surface 25, and the inner side surface 27 generally has a quadrilateral shape, and four corner portions. Note that each of the upper surface 17, the lower surface 19, the front side surface 21, the rear side surface 23, the outer side surface 25, and the inner side surface 27 having a "quadrilateral shape" means that each can generally have a quadrilateral shape, and not necessarily a quadrilateral shape in a strict sense. The corners of each surface region can each have a rounded shape when viewed from the front thereof, and the sides located connecting neighboring corners need not have a strictly straight line shape, but can have a shape in which a portion thereof has unevenness.

Although the size of the insert 5 is not particularly limited, for example, in the present embodiment, the maximum value of the width between the front side surface 21 and the rear side surface 23 when viewed from the top (or when viewed from the front of the upper surface 17) can be set to about from 5 to 20 mm. Further, the maximum value of the width between the inner side surface 27 and the outer side surface 25 when viewed from the top can be set to about from 5 to 20 mm. Further, the maximum value of the thickness between the upper surface 17 and the lower surface 19 can be from 3 to 10 mm.

Examples of the material of the insert 5 include cemented carbide alloy, cermet, or the like. Examples of the composition of the cemented carbide alloy include WC—Co, WC—TiC—Co, and WC—TiC—TaC—Co. WC—Co is produced by adding a cobalt (Co) powder to tungsten carbide (WC), and sintering the mixture. For WC—TiC—Co, titanium carbide (TiC) is added to WC—Co. For WC—TiC—TaC—Co, tantalum carbide (TaC) is added to WC—TiC—Co.

Further, cermet is a sintered composite material obtained by combining a metal with a ceramic component. Specifically, examples of the cermet include compounds in which a titanium compound such as titanium carbide (TiC) or titanium nitride (TiN) is the main component.

The insert 5 of the present embodiment includes a cutting edge 29. The cutting edge 29 is positioned at at least a part of a portion where two surfaces of the insert 5 intersect. In the present embodiment, the cutting edge 29 is positioned at the portion where the front side surface 21 and the outer side surface 25 intersect, and the portion where the front side surface 25 and the lower surface 19 intersect. The cutting edge 29 may be positioned in parts of the portion where the front side surface 21 and the outer side surface 25 intersect, and the portion where the front side surface 25 and the lower surface 19 intersect, or may be positioned in these portions as a whole.

The cutting edge 29 of the present embodiment includes an outer periphery cutting edge 31 and a front tip cutting edge 33. The outer periphery cutting edge 31 is positioned in the portion where the front side surface 21 and the outer side surface 25 intersect. A length of the outer periphery cutting edge 31 can be set, for example, to about from 3 to 7 mm. Further, the front tip cutting edge 33 is positioned in the portion where the front side surface 21 and the lower surface 19 intersect. A length of the front tip cutting edge 33 can be set, for example, to about from 2 to 5 mm.

The cutting tool 1 of the present embodiment is a tool that is used for so-called milling, and cuts a workpiece by moving in a direction generally orthogonal to the rotational axis O while the holder 3 rotates about the rotational axis O. As a result, the outer periphery cutting edge 31 functions as a cutting edge that mainly cuts the workpiece, and the front tip cutting edge 33 functions as a "flat cutting edge" that reduces the unevenness of the machined surface of the workpiece.

In the cutting tool 1 of the present embodiment, the inserts 5 are each mounted on the holder 3 so that the outer periphery cutting edge 31 inclines with respect to the rotational axis O. This angle of inclination is a so-called axial rake, and can be set to about from 3 to 20°, for example, in the present embodiment.

The front side surface 21 is positioned forward in the rotational direction X1 of the insert 5. As a result, the front side surface 21 functions as a "rake face" on which the chips flow when machining is performed. Further, the outer side surface 25 and the lower surface 19 function as "relief faces" when machining is performed.

Further, the front side surface 21 of the present embodiment includes a flat region in the center portion thereof. The front side surface 21 includes an inclined region in the portion along the outer periphery cutting edge 31 and the front tip cutting edge 33, the inclined portion being inclined so as to become closer to the rear side surface 23 as the distance from the cutting edge 29 thereof increases. With the inclined region thus included, it is possible to decrease a cutting resistance when cutting the workpiece.

Figure 11:
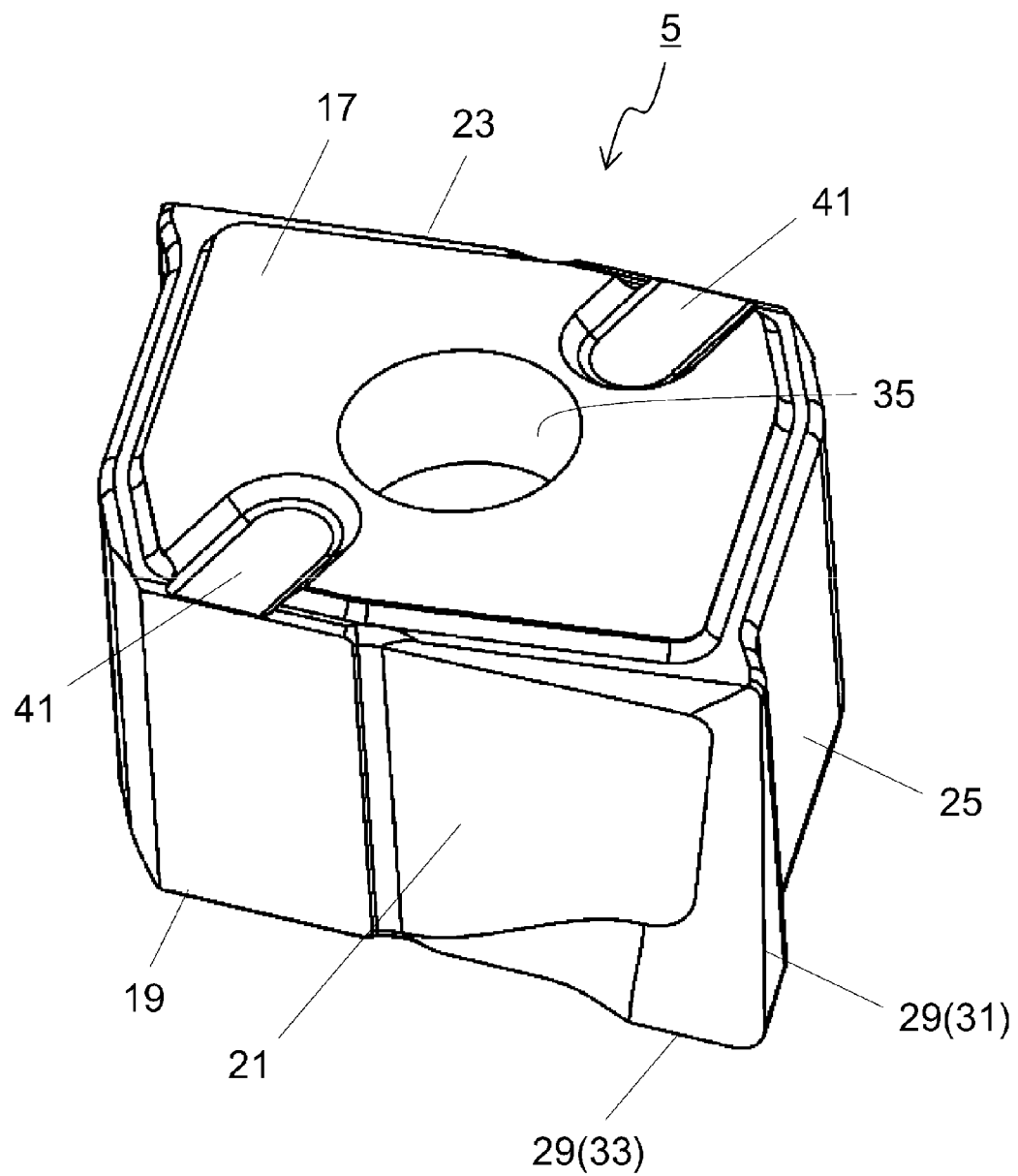
FIG. 11 is a perspective view illustrating an insert of the first embodiment.

The insert 5 of the present embodiment includes a through-hole 35, as illustrated in FIG. 11. The through-hole 35 penetrates the insert 5 from the upper surface 17 to the lower surface 19. In other words, the through-hole 35 is positioned from the upper surface 17 to the lower surface 19 of the insert 5, and is open at the upper surface 17 and the lower surface 19. Thus, the through-hole 35 is not open at the side surfaces of the insert 5. The penetrating direction of the through-hole 35 of the present embodiment is along a rotational axis O1.

The through-hole 35 is an area for screwing the insert 5 into the holder 3. Specifically, the screw 15 is inserted into the through-hole 35 of the insert 5 and the leading end of this screw 15 is inserted into a screw hole (not illustrated) formed in the pocket 9 such that the insert 5 is mounted on the holder 3 by fixing the screw 15 into the screw hole.

Figure 4:
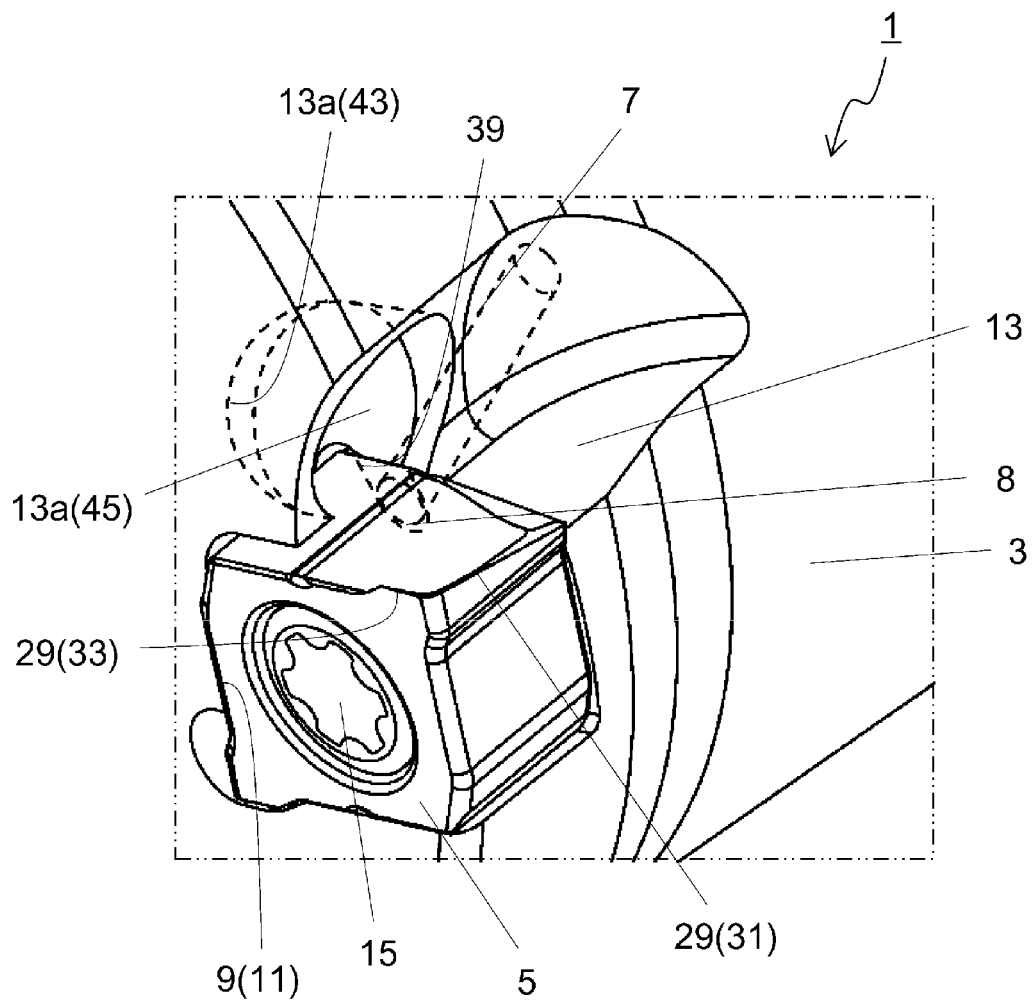
FIG. 4 is an enlarged view of a region A2 illustrated in FIG. 3.
Figure 5:
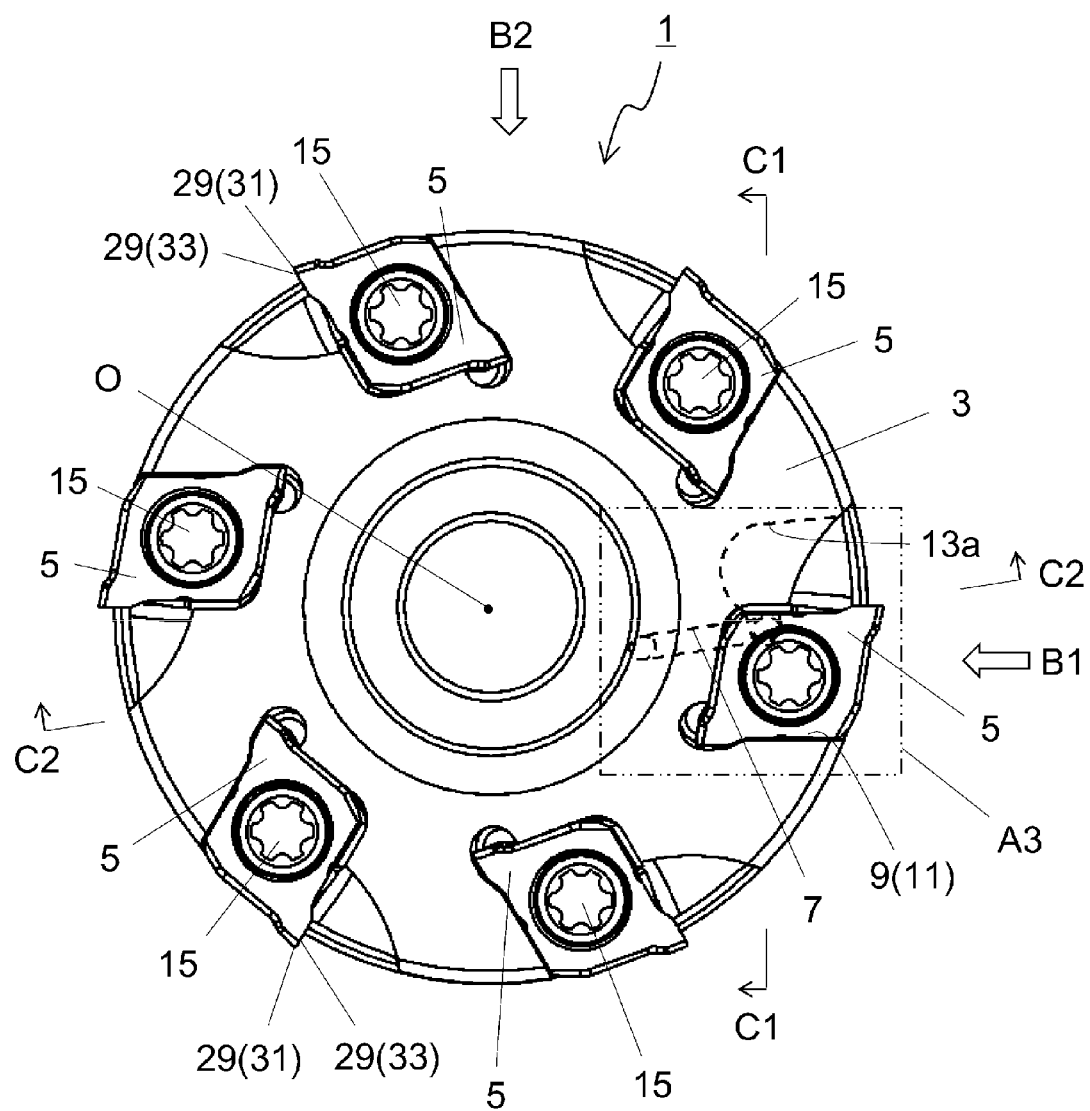
FIG. 5 is a plane view of the cutting tool illustrated in FIG. 1 as viewed from the front tip thereof.
Figure 8:
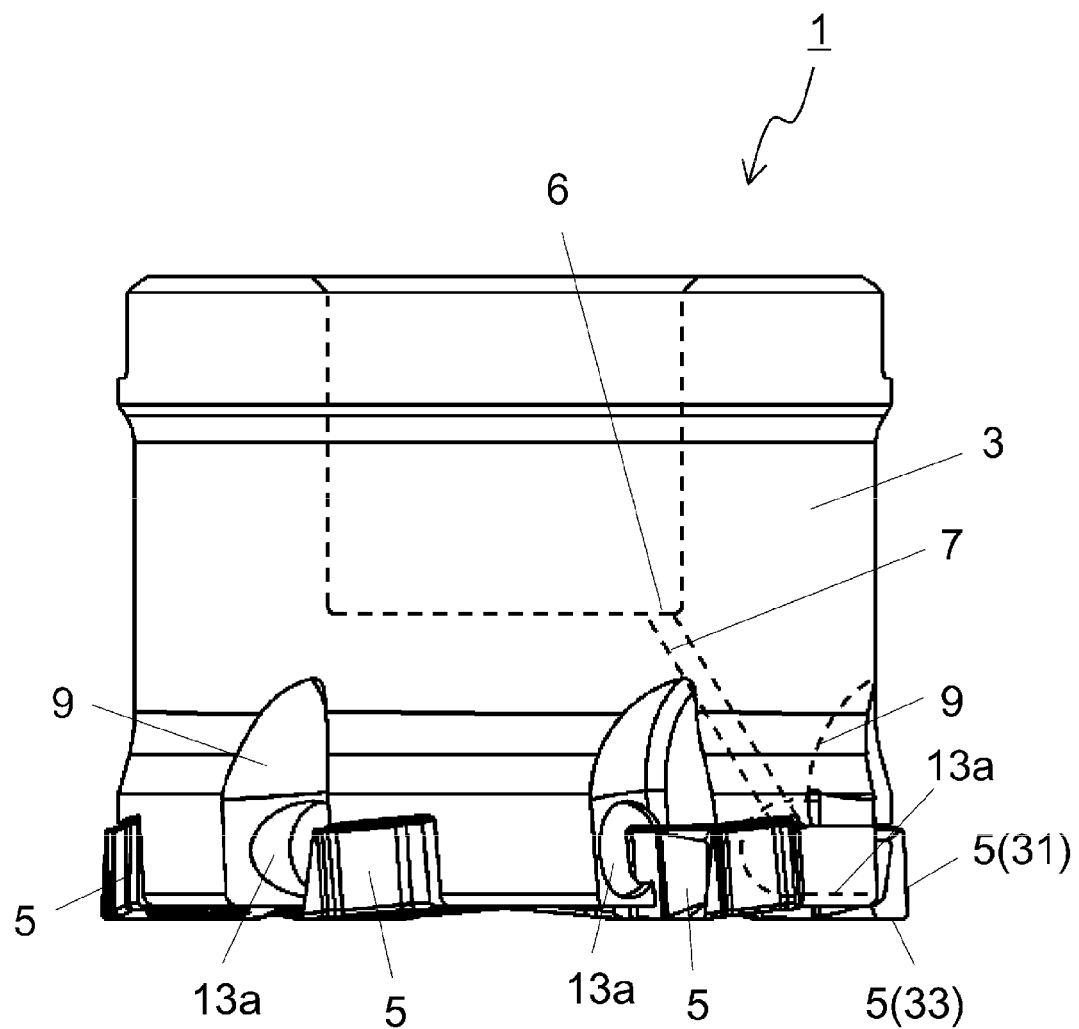
FIG. 8 is a side view of the cutting tool illustrated in FIG. 5 as viewed from a B2 direction.
Figure 9:
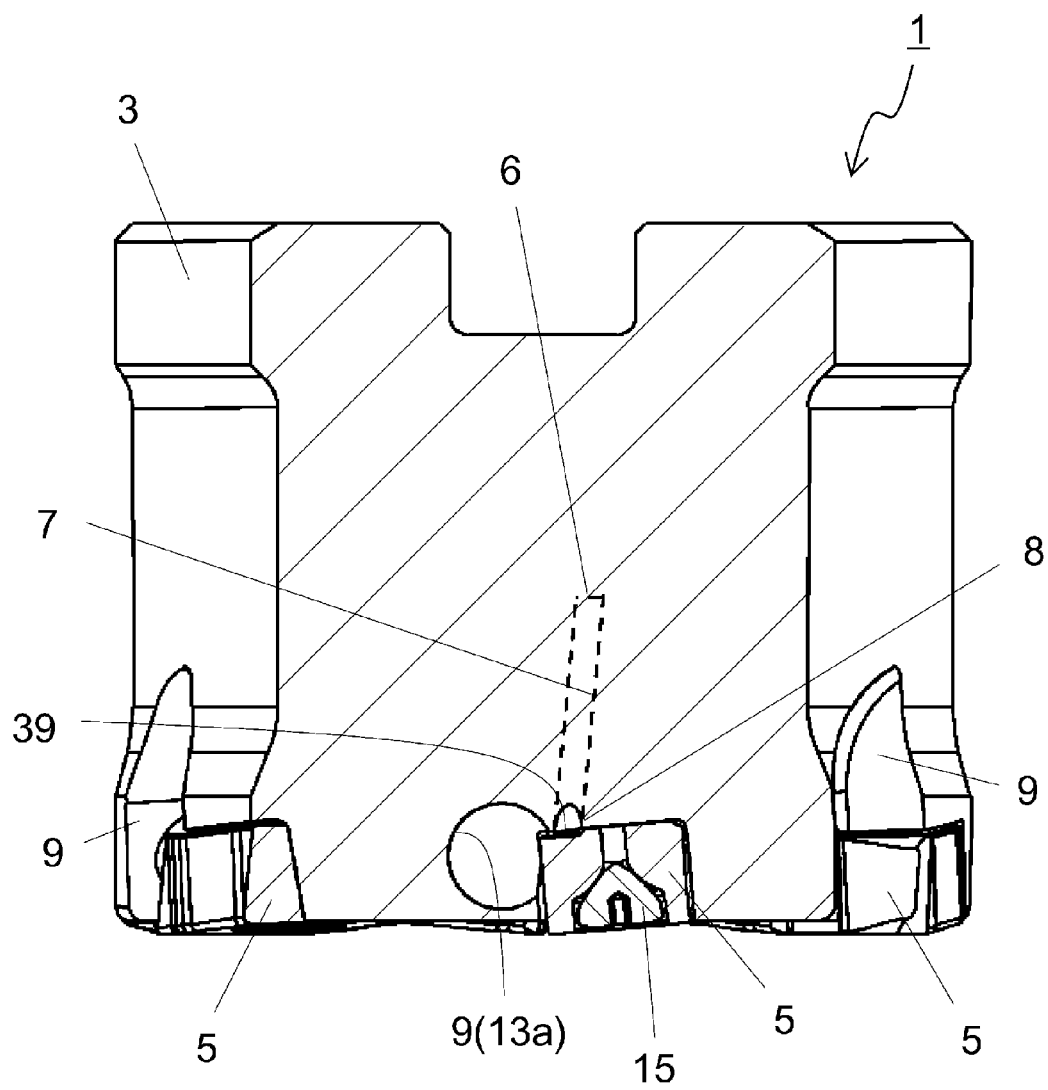
FIG. 9 is a C1-C1 cross-sectional view of the cutting tool illustrated in FIG. 5.
Figure 10:
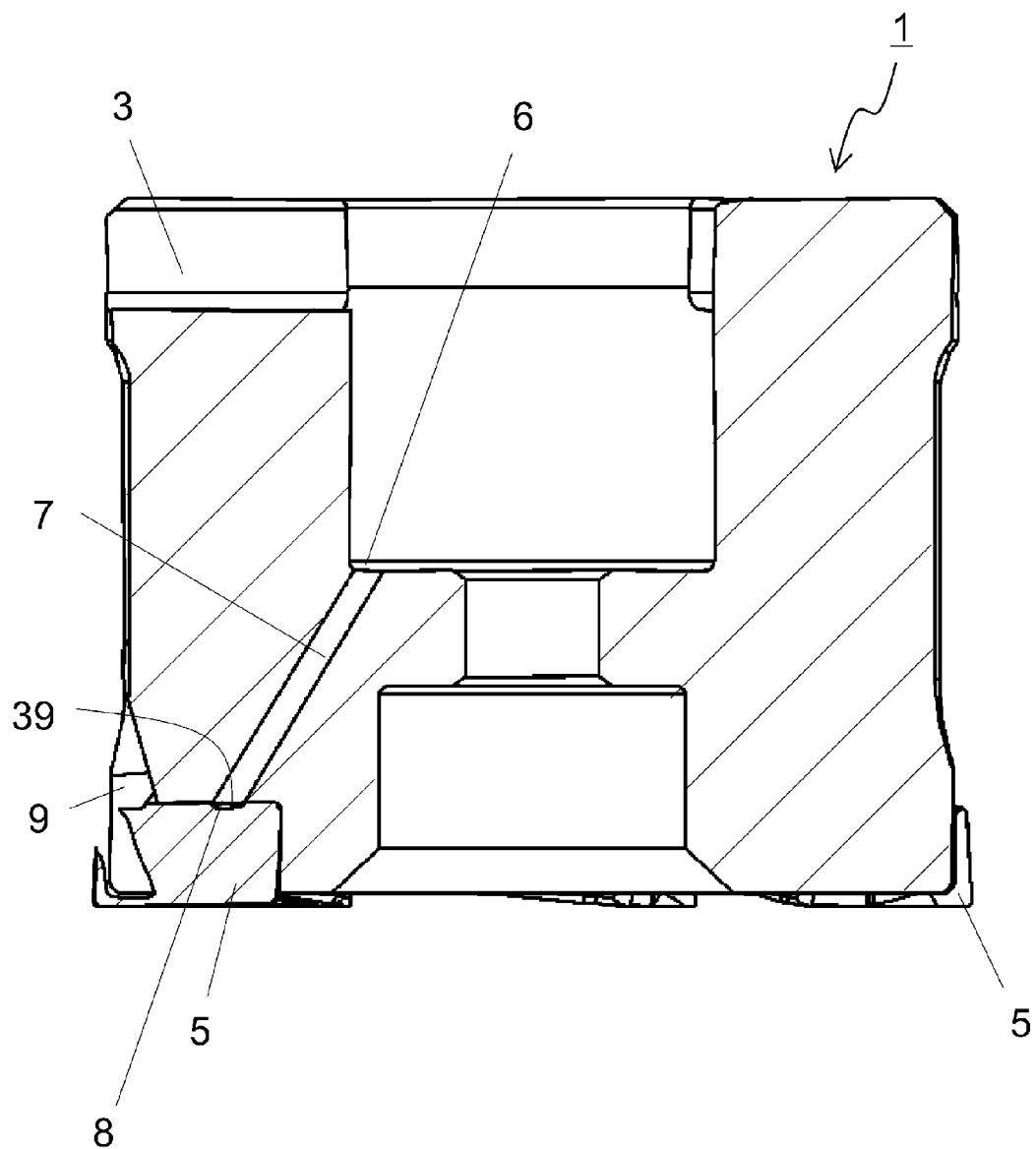
FIG. 10 is a C2-C2 cross-sectional view of the cutting tool illustrated in FIG. 5.

The holder 3 of the present embodiment, as illustrated in FIGS. 2 and 4, includes the first flow path 7 through which a fluid (coolant) flows for cooling the insert 5. The first flow path 7 functions as a section through which the coolant flows when the cutting tool 1 is used. The coolant is supplied from the inflow port 6 of the holder 3. The inflow port 6 opens at at least a part of the holder 3. FIG. 8 illustrates an example in which the inflow port 6 is positioned at the rear tip. The coolant supplied from the inflow port 6 flows through the first flow path 7 positioned in the interior of the holder 3, toward the outflow port 8.

In the present embodiment, the outflow port 8 is connected from the first flow path 7 and is in the pocket 9. Specifically, the outflow port 8 is adjacent to the placement portion 11 and opens at the placement portion 11. The outflow port 8 described above is connected to a second flow path 39, and the coolant that flows through the first flow path 7 flows through the second flow path 39 to the outside.

In the present embodiment, the second flow path 39 is positioned between the outflow port 8 and the recessed portion 13a, and opens toward the recessed portion 13a in the pocket 9. The coolant that flows through the first flow path 7 passes through the second flow path 39 and is ejected toward the recessed portion 13a.

Thus, the coolant is not ejected outward from the holder 3, but rather toward the recessed portion 13a in the pocket 9. As a result, the coolant ejected from the first flow path 7 is collected in the recessed portion 13a, and the coolant collected in the recessed portion 13a flows to the cutting edge 29, thereby cooling the cutting edge 29. That is, the cutting tool 1 of the present embodiment includes the recessed portion 13a in the cutout portion 13, making it possible to collect the coolant in this recessed portion 13a. This decreases the possibility that the coolant flows outward from the cutting tool 1 without being used for cooling the cutting edge 29, and thus increases the cooling efficiency of the insert 5.

Further, because the coolant ejected from the first flow path 7 is collected in the recessed portion 13a, and the coolant collected in the recessed portion 13a flows to the cutting edge 29, it is possible to suitably disperse the coolant. As a result, a broad range of the cutting edge 29 can be cooled. Further, with the coolant suitably dispersed, the chips produced by the cutting edge 29 are readily discharged to the outside in a stable manner. This makes the chips less likely to become pinched on the machined surface, and thus increases the durability of the cutting edge 29.

The coolant is, for example, made from a water-insoluble or a water-soluble oil, and is suitably selected and used according to the material of the workpiece. Examples of the water-insoluble oil include an oil-based type, an inactive extreme-pressure type, or an active extreme-pressure type cutting oil. Examples of the water-soluble oil include a cutting oil such as an emulsion, a soluble, or a solution.

In the present embodiment as illustrated in FIGS. 2 and 4, the flow path is configured by the first flow path 7 and the second flow path 39, and the like. The first flow path 7 has a hole shape provided in the interior of the holder 3, and extends from the rear tip toward the front tip of the holder 3. At this time, one end portion of the first flow path 7 is open at the placement portion 11 of the pocket 9. In the present embodiment, a plurality of the first flow paths 7 are provided in accordance with the number of pockets 9. Specifically, the holder 3 includes six pockets 9, and therefore six first flow paths 7 are provided. Each of the plurality of first flow paths 7 extends in a straight manner. With six first flow paths 7 formed, six second flow paths 39 are also provided.

In the present embodiment, the second flow path 39 is disposed between the placement portion 11 and the insert 5 of the holder 3. With the inner surface of the second flow path 39 thus partially configured by the insert 5, the insert 5 can be cooled at the second flow path 39 as well.

The second flow path 39 of the present embodiment extends from the first flow path 7 toward the recessed portion 13a in a straight manner. This makes it possible to collect the coolant ejected from the first flow path 7 in the recessed portion 13a in a stable manner.

Figure 12:
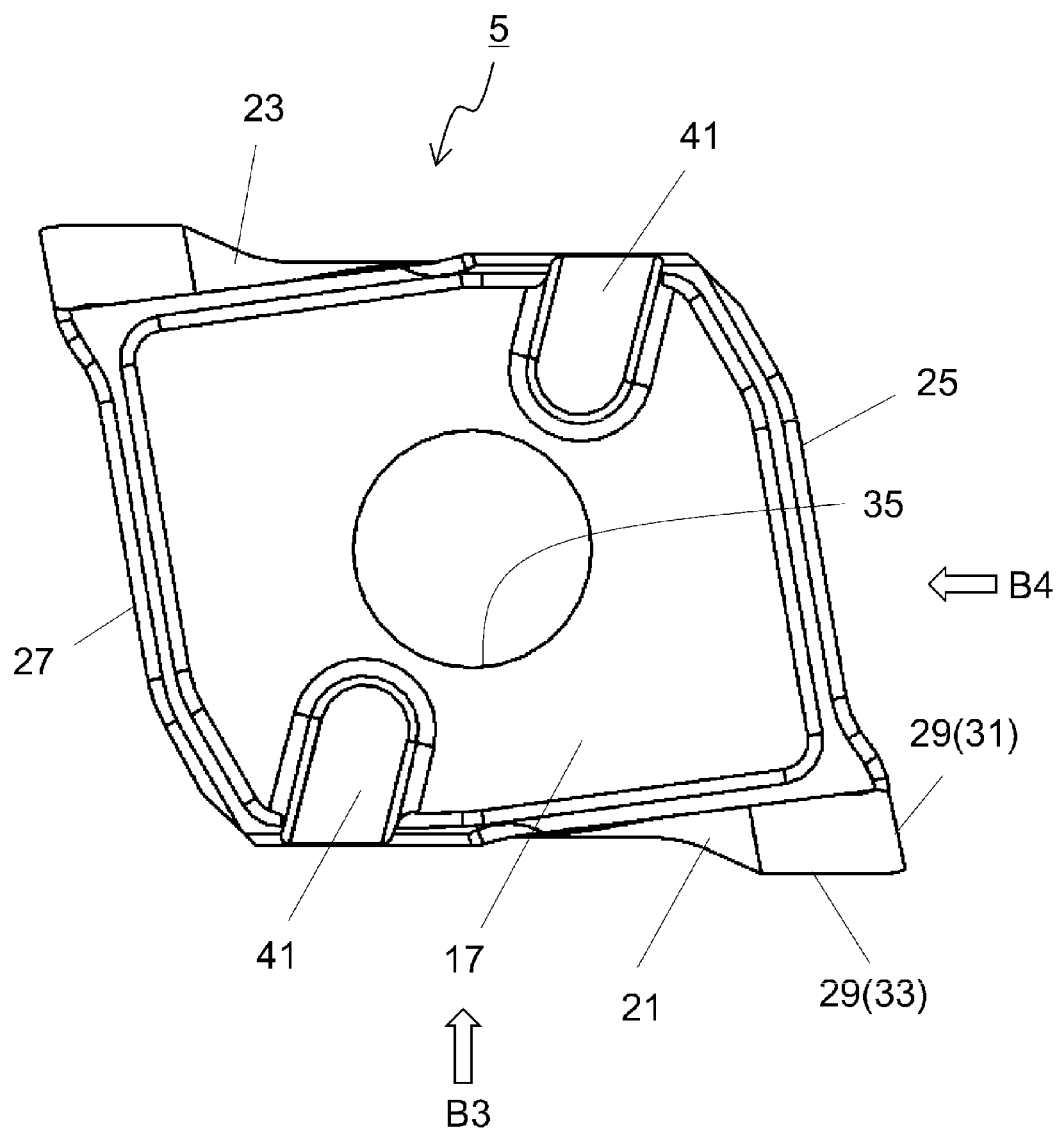
FIG. 12 is a top view of the insert illustrated in FIG. 11.
Figure 13:
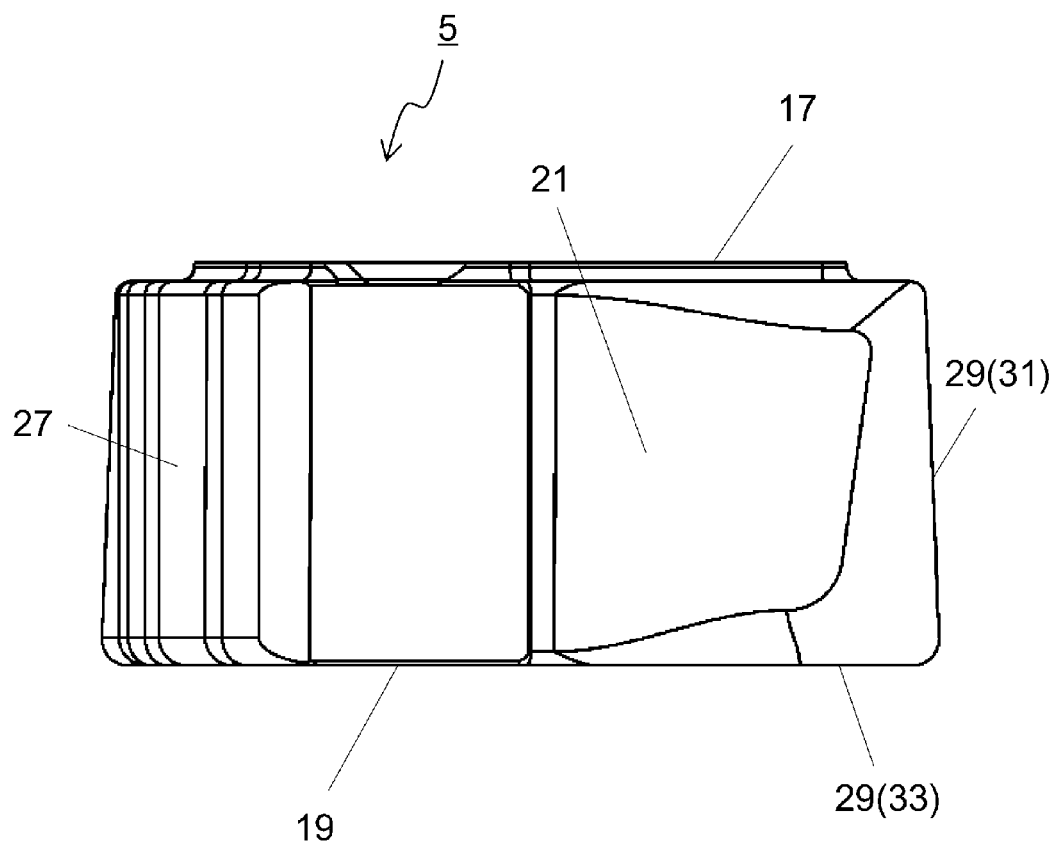
FIG. 13 is a side view of the insert illustrated in FIG. 12 as viewed from a B3 direction.
Figure 14:
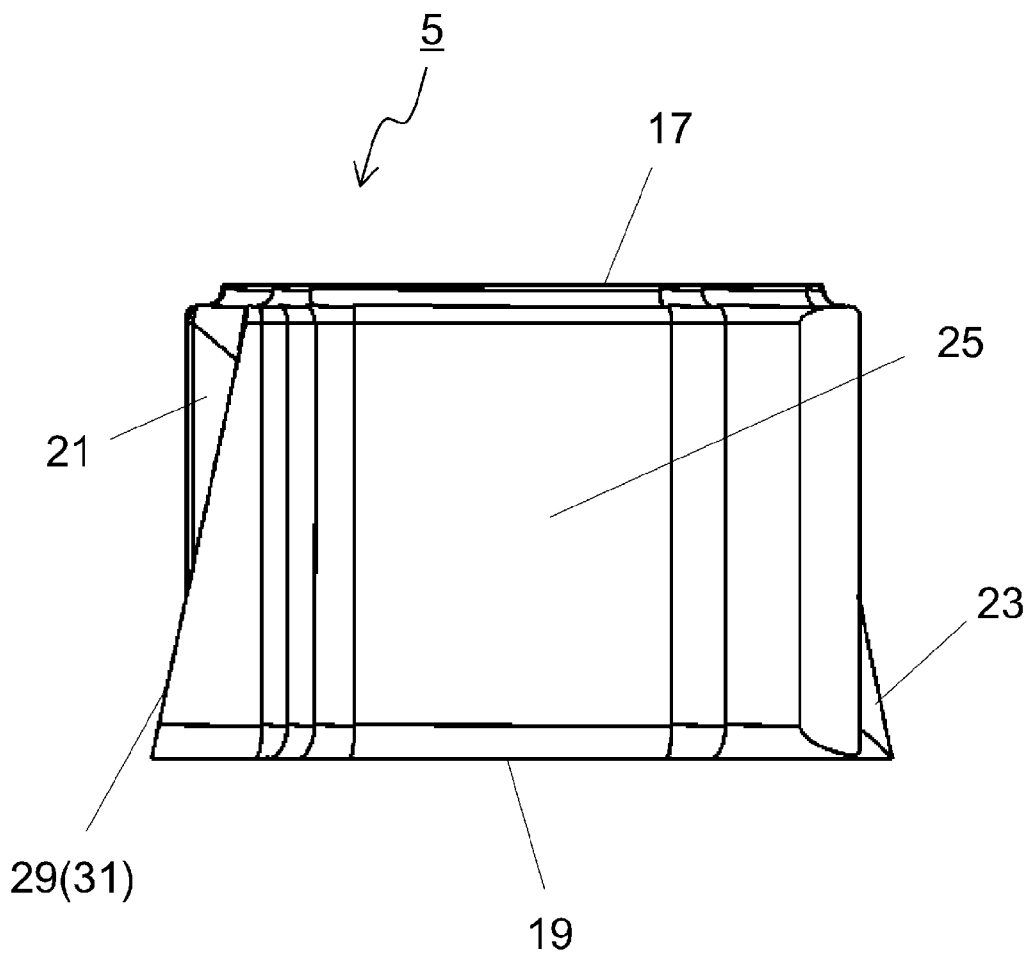
FIG. 14 is a side view of the insert illustrated in FIG. 12 as viewed from a B4 direction.

In the present embodiment as illustrated in FIGS. 11 and 12, the insert 5 includes a groove portion 41 positioned on the upper surface 17 which faces the placement portion 11 of the holder 3. The groove portion 41 extends to an end portion on the side of the front side surface 21 of the upper surface 17. When the insert 5 is mounted on the placement portion 11, one end portion of the groove portion 41 connects with the outflow port 8 of the first flow path 7. Further, the other end portion of the groove portion 41 opens to the front side surface 21. That is, the groove portion 41 constitutes a portion of the second flow path 39.

The second flow path 39 may be configured by, for example, forming the groove portion that connects to the first flow path 7 on the placement portion 11, but is preferably configured by the surface of the placement portion 11 and the groove portion 41 formed on the surface of the insert 5, as in the present embodiment. This allows the surface area of the insert 5 that comes into contact with the coolant to be increased, making it possible to cool the insert 5 more efficiently.

In the present embodiment, the cross-sectional area of the cross section of the second flow path 39 orthogonal to the direction in which the coolant flows is smaller than that of the first flow path 7. This allows the pressure of the coolant that flows from the first flow path 7 to the second flow path 39 to increase in the second flow path 39, making it possible to increase an outflow velocity of the coolant ejected into the recessed portion 13a. As a result, the coolant is readily dispersed within the recessed portion 13a, thereby facilitating the cooling of the cutting edge 29 in its entirety.

The recessed portion 13a has the function of collecting the coolant that comes from the flow path. In the present embodiment as illustrated in FIG. 6, the recessed portion 13a is at least partially positioned on a first virtual line L1 that connects the rotational axis O and the cutting edge 29, in a transparent view from the front tip.

The holder 3 rotates about the rotational axis O during the machining of the workpiece. As a result, a centrifugal force is applied to the coolant that has reached the recessed portion 13a. This centrifugal force causes the coolant to flow from the center of the holder 3 to the outer periphery. In the present embodiment, the recessed portion 13a is at least partially positioned on the first virtual line L1 that connects the rotational axis O and the cutting edge 29 when viewed from the front tip. Therefore, the coolant that flows out from the recessed portion 13a due to the centrifugal force readily flows toward the cutting edge 29. This makes it possible to cool the cutting edge 29 efficiently.

Figure 6:
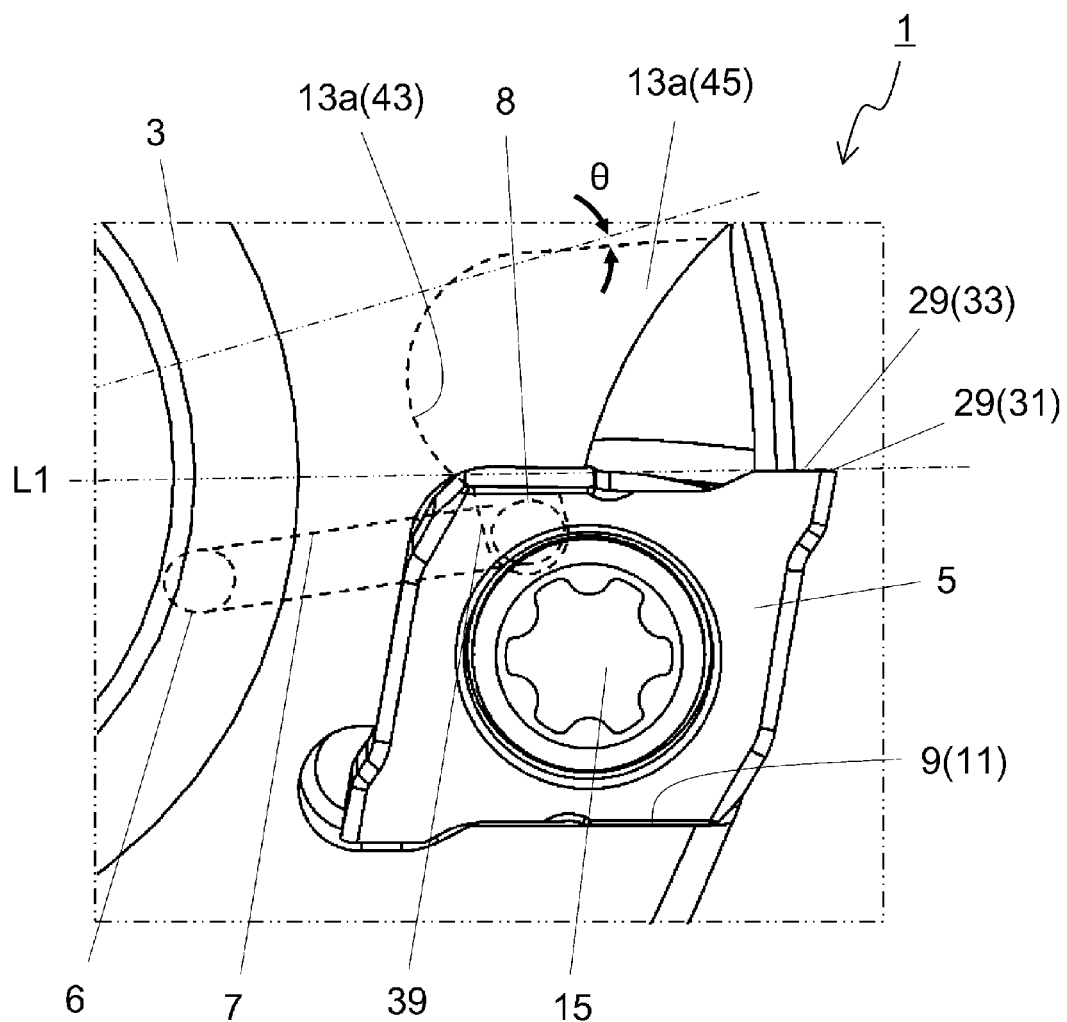
FIG. 6 is an enlarged view of a region A3 illustrated in FIG. 5.
Figure 7:
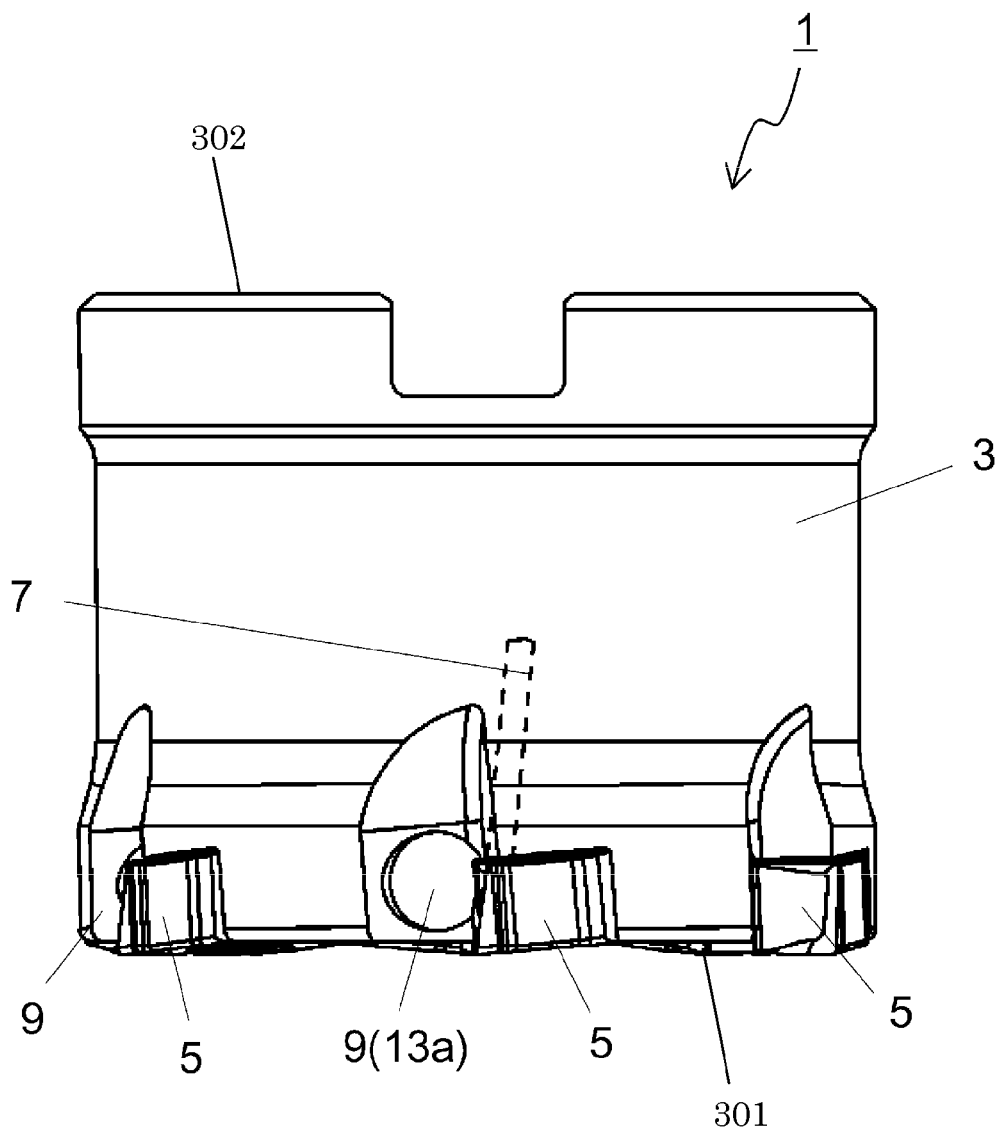
FIG. 7 is a side view of the cutting tool illustrated in FIG. 5 as viewed from a B1 direction.

In the present embodiment as illustrated in FIGS. 2, 6, and the like, the recessed portion 13a is configured by a first portion 43 and a second portion 45. The first portion 43 is positioned inward from the holder 3, and has a curved surface shape. The second portion 45 is positioned further outward from the holder 3 than the first portion 43, and extends from the first portion 43 toward the outer periphery of the holder 3. The first portion 43 and the second portion 45 in the present embodiment are smoothly connected without a step provided therebetween.

A bottom surface of the recessed portion 13a of the present embodiment has a curved surface shape. That is, the bottom portion of the recessed portion 13a is the first portion 43. Note that the term "curved surface shape" herein refers to a so-called recessed surface shape and is a curved shape in which the center portion sinks further than the outer peripheral portion. In the present embodiment, the second flow path 39 of the first flow path 7 extends toward the bottom surface of the recessed portion 13a, that is, toward the first portion 43.

With the bottom surface of the recessed portion 13a thus having a curved surface shape, the coolant ejected from the flow path can be collected. In addition, with the bottom surface having a curved surface shape, the direction in which the coolant flows can be smoothly changed. As a result, the coolant can be made to flow toward the cutting edge 29 without excessively weakening the force of the flow of the coolant.

Further, the recessed portion 13a of the present embodiment further includes the second portion 45 in addition to the first portion 43. The second portion 45 is positioned outward from the first portion 43, and has a cylindrical shape. With the second portion 45 extending straight from the first portion 43 and outward from the holder 3, the direction in which the coolant flows inside the recessed portion 13a is easily determined. This keeps the direction in which the coolant flows from scattering excessively.

In the cross section orthogonal to the direction in which the second portion 45 extends, the surface of the second portion 45 is not a polygonal shape such as a quadrilateral, for example, but rather includes a curved portion. That is, the term "cylindrical shape" in the present embodiment means that the shape of the above-described cross section is not strictly circular or polygonal, but rather includes a curved portion.

In the present embodiment, the second flow path 39 is positioned between the outflow port 8 and the first portion 43 of the recessed portion 13a. That is, the second flow path 39 extends toward the first portion 43 of the recessed portion 13a. The coolant that is ejected from the second flow path 39 to the recessed portion 13a is injected to the first portion 43 having a curved surface shape, and therefore, the coolant is less likely to bounce back at the recessed portion 13a, and the force of the flow of the coolant is less likely to be excessively weakened.

In the present embodiment, in a transparent view of the cutting tool 1 from the front tip, the second portion 45 of the recessed portion 13a is inclined rearward in the rotational direction X1 from a first end portion positioned inward from the holder 3 toward a second end portion positioned outward from the holder 3. In the present embodiment, the second portion 45 is inclined rearward in the rotational direction X1 at an angle θ, as illustrated in FIG. 6.

The placement portion 11 on which the insert 5 is mounted is positioned rearward in the rotational direction X1 with respect to the recessed portion 13a. Thus, with the second portion 45 being inclined as described above, the coolant readily flows from the recessed portion 13a toward the cutting edge 29.

Next, detailed description will be given of a cutting tool according to a second embodiment with reference to FIGS. 15 to 22.

Figure 15:
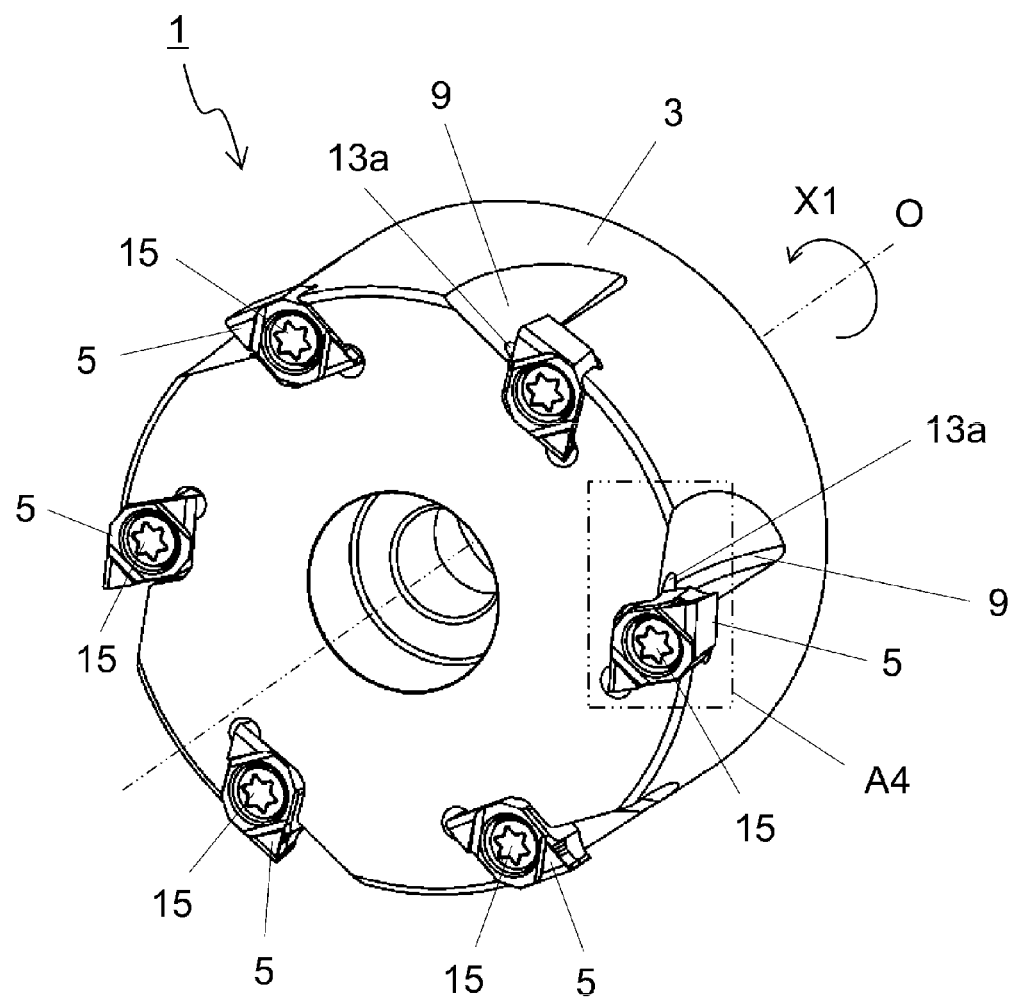
FIG. 15 is a perspective view illustrating a cutting tool of a second embodiment.
Figure 16:
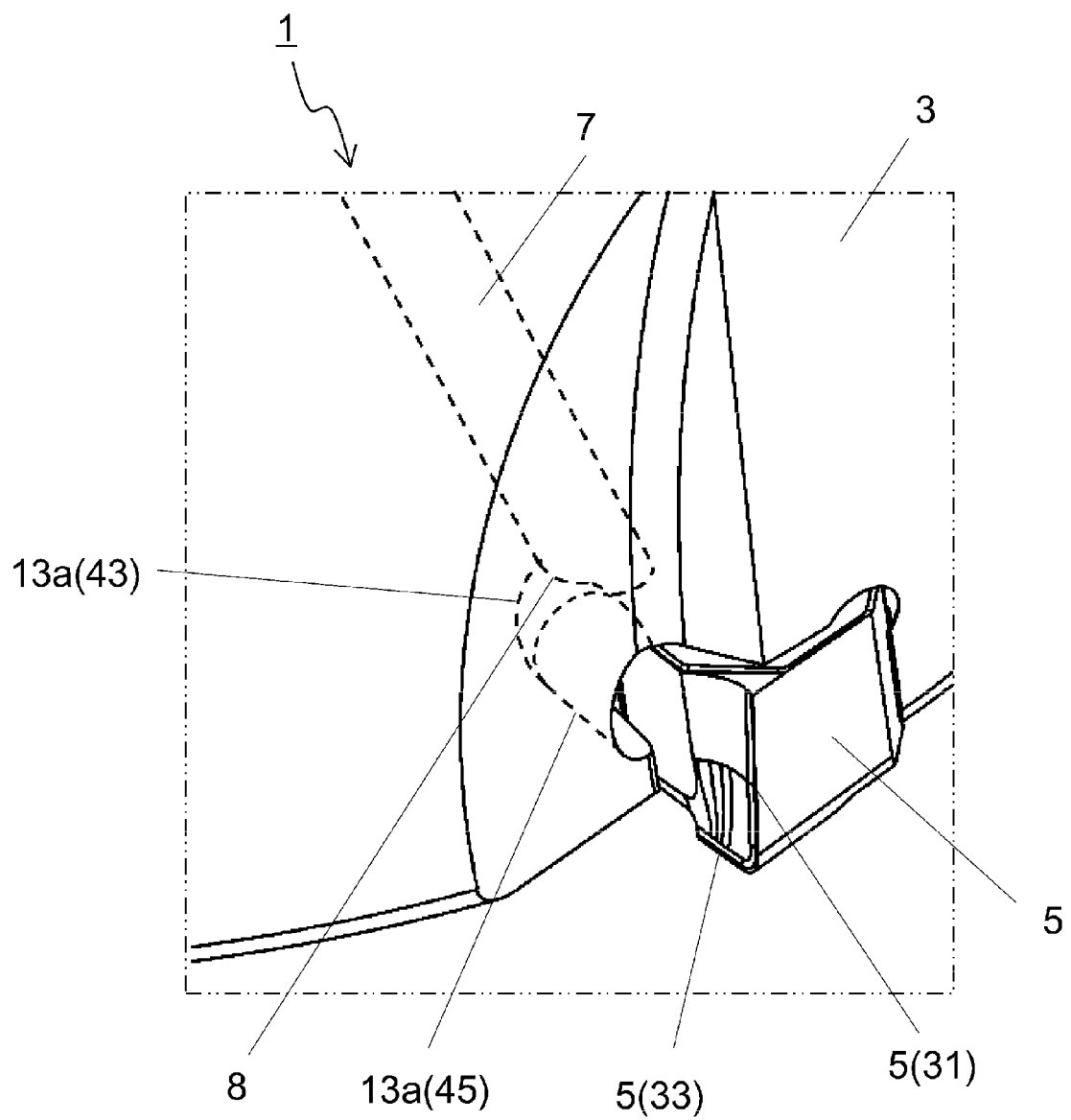
FIG. 16 is an enlarged view of a front tip section of the cutting tool illustrated in FIG. 15.
Figure 17:
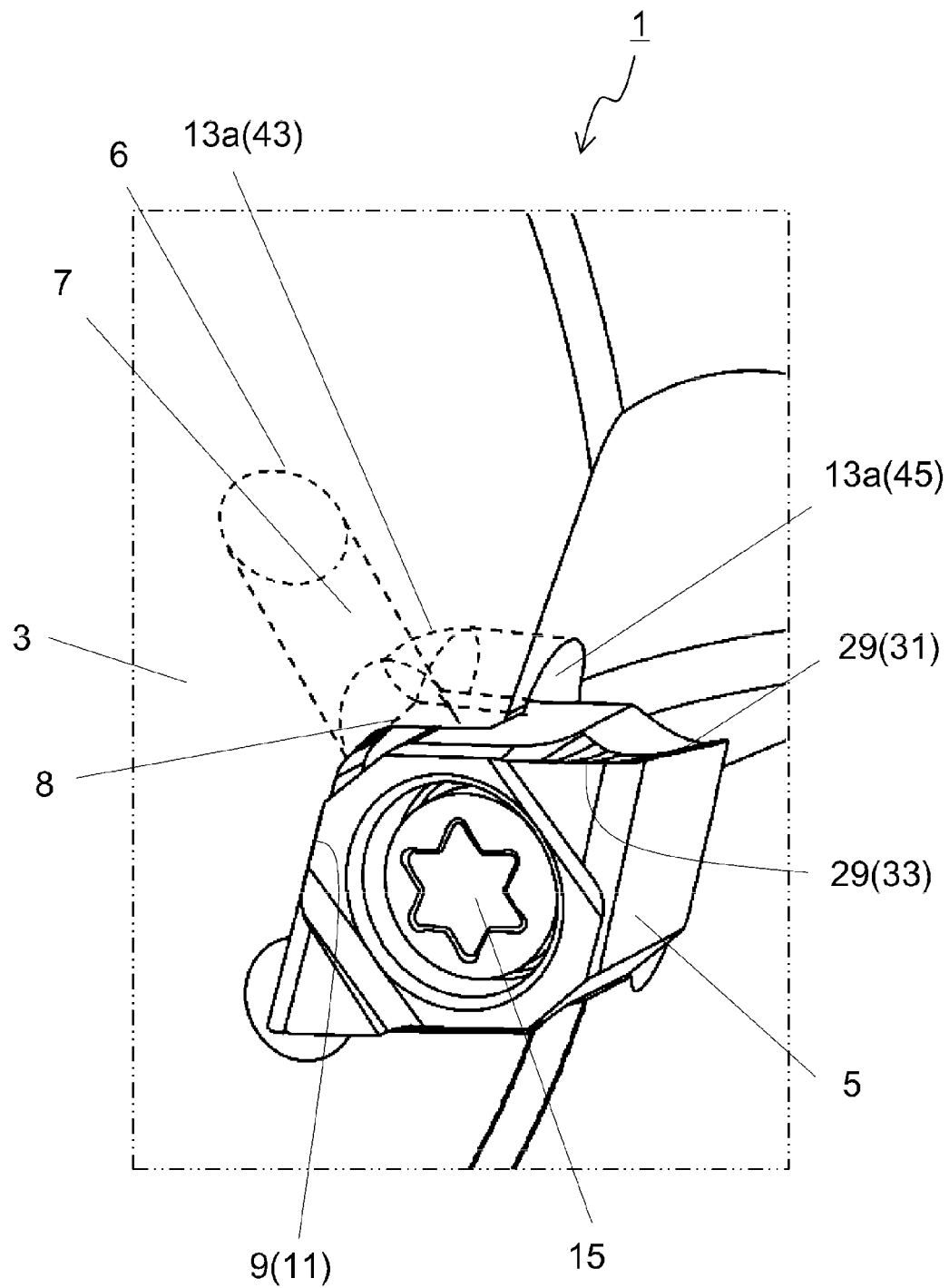
FIG. 17 is an enlarged view of a region A4 illustrated in FIG. 15.
Figure 19:
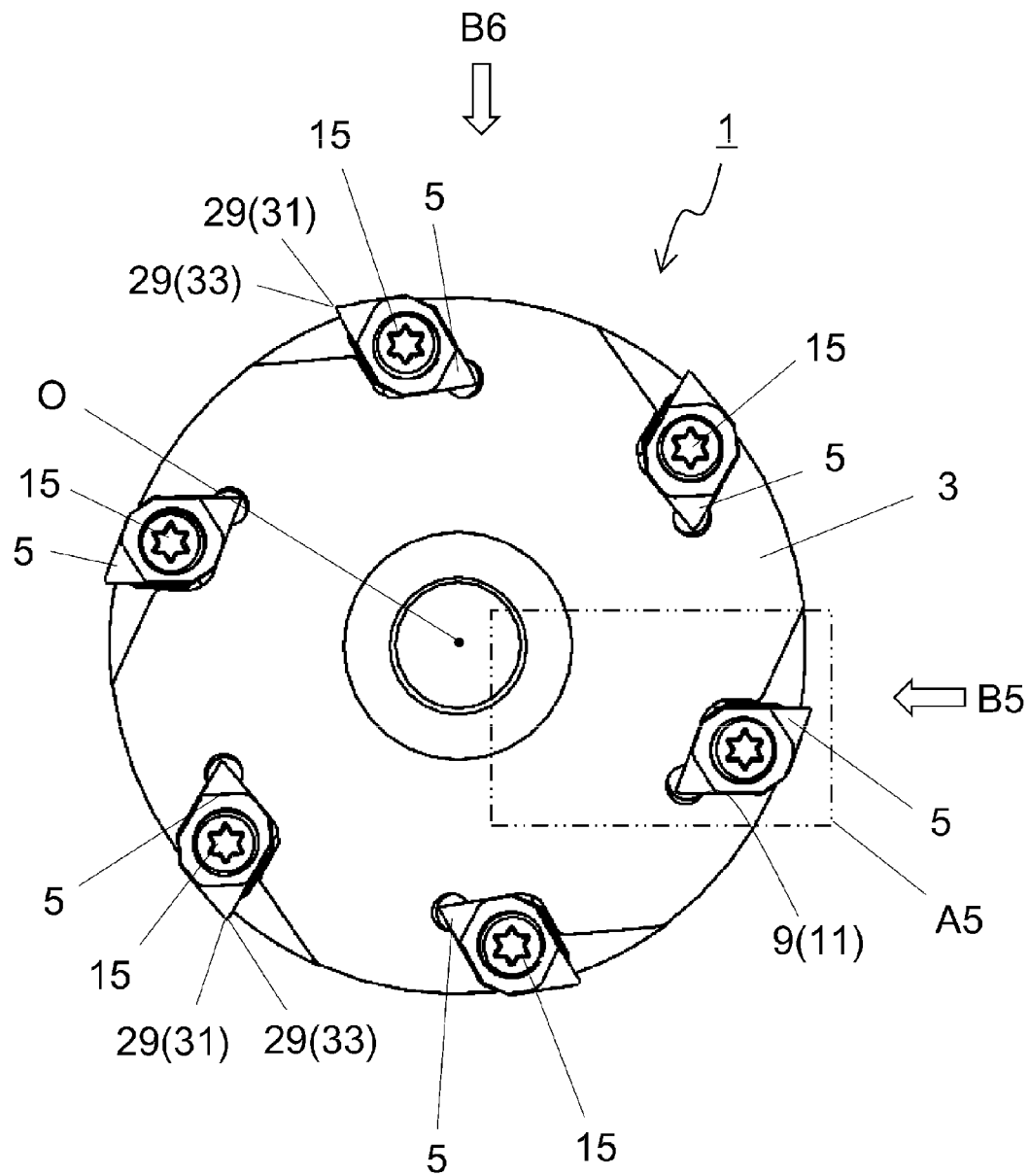
FIG. 19 is a plane view of the cutting tool illustrated in FIG. 15 as viewed from the front tip thereof.
Figure 20:
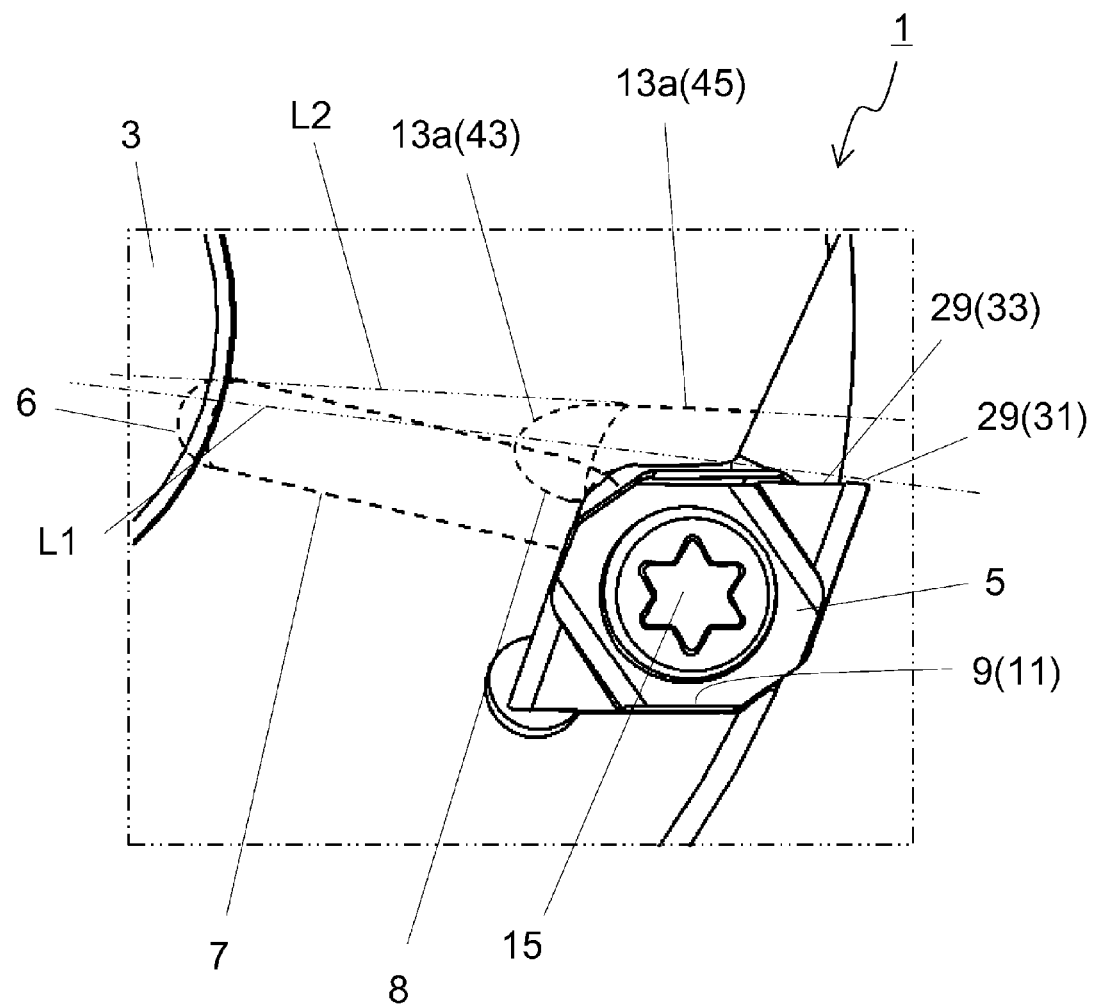
FIG. 20 is an enlarged view of a region A5 illustrated in FIG. 19.
Figure 21:
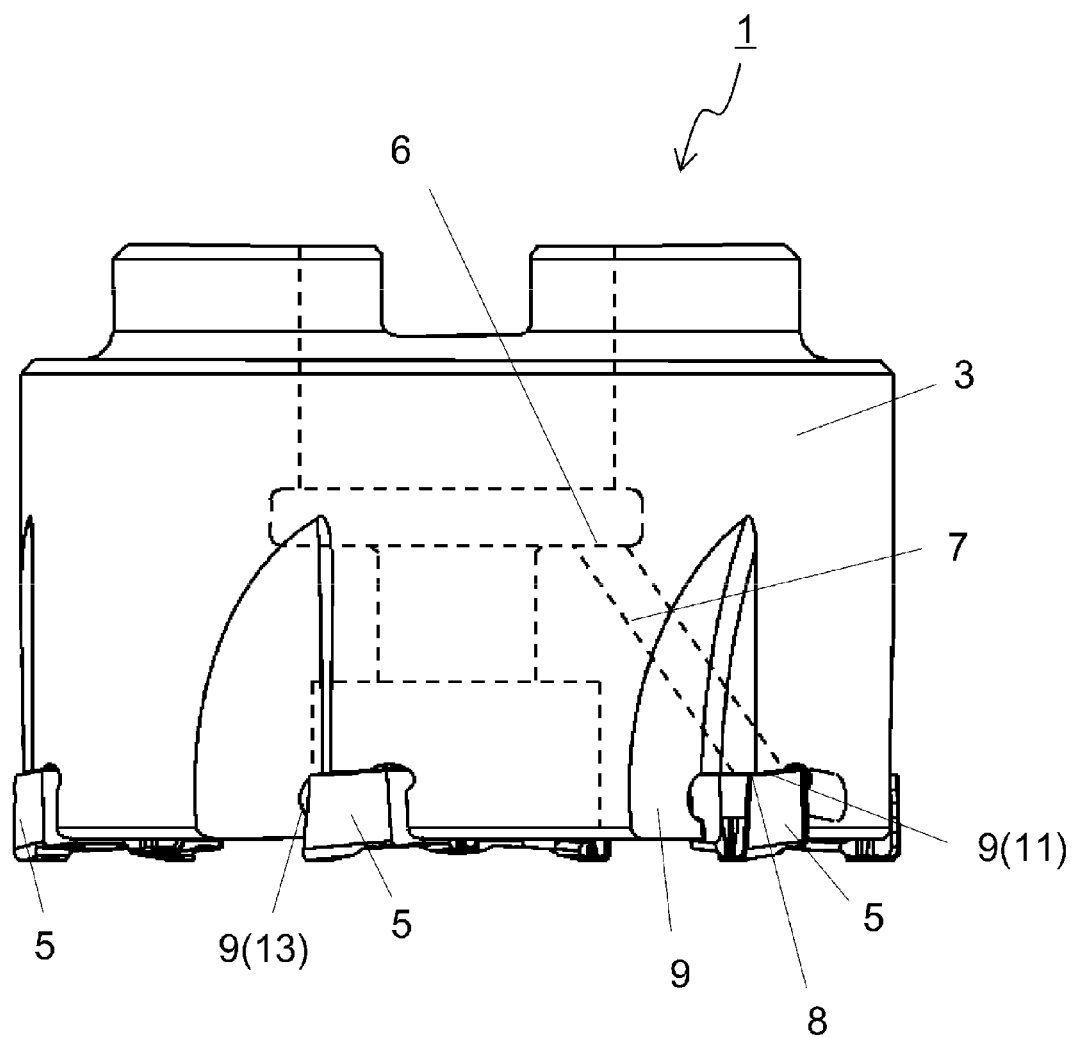
FIG. 21 is a side view of the cutting tool illustrated in FIG. 19 as viewed from a B5 direction.
Figure 22:
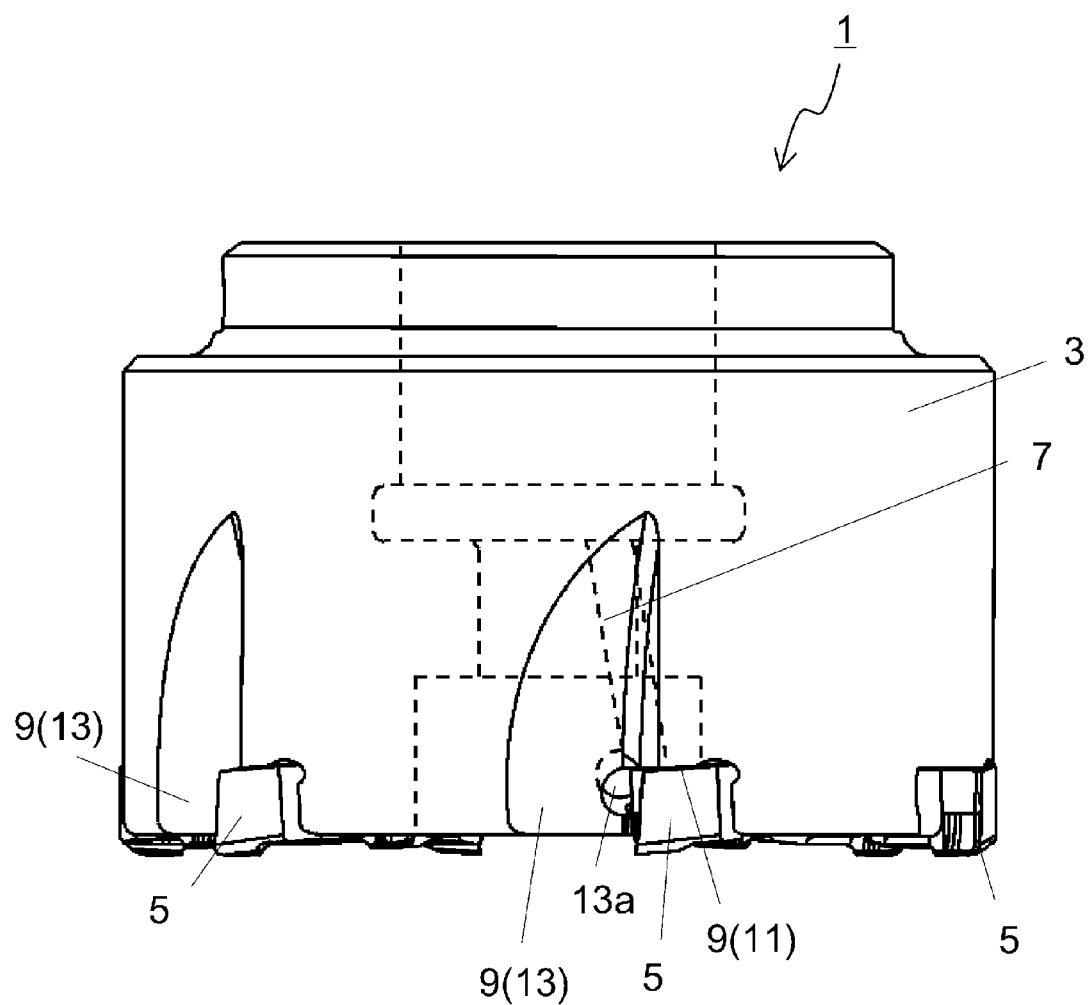
FIG. 22 is a side view of the cutting tool illustrated in FIG. 19 as viewed from a B6 direction.

FIG. 15 is a perspective view corresponding to FIG. 3 of the first embodiment. FIG. 16 is a perspective view corresponding to FIG. 2 of the first embodiment. FIG. 19 is a perspective view corresponding to FIG. 5 of the first embodiment. FIG. 21 is a perspective view corresponding to FIG. 7 of the first embodiment. FIG. 22 is a perspective view corresponding to FIG. 8 of the first embodiment.

In the second embodiment, similar to the cutting tool 1 of the first embodiment, the cutting tool 1 includes the holder 3 and the plurality of inserts 5. Further, the holder 3 includes the inflow port 6 that opens at at least one part of the holder 3, the first flow path 7 positioned in the interior of the holder 3, the outflow port 8, and the pocket 9. Compared to the cutting tool 1 of the first embodiment, the cutting tool 1 of the present embodiment mainly differs in the configuration of the flow path in which the coolant flows and the recessed portion 13a.

Specifically, although the flow path of the first embodiment is configured by the first flow path 7 and the second flow path 39 that extend in a straight manner, the flow path of the present embodiment is configured by the first flow path 7 only and does not have a configuration equivalent to the second flow path 39. The first flow path 7 in the present embodiment, similar to the first flow path 7 in the first embodiment, has a shape that extends in a straight manner.

In the present embodiment, the first flow path 7 has a hole shape, and includes one end portion that opens over the placement portion 11 of the pocket 9 and the recessed portion 13a. As a result, the coolant that has flowed from the first flow path 7 is supplied directly to the recessed portion 13a without passing through the second flow path 39.

Note that, while the first flow path 7 opens at the placement portion 11 of the pocket 9 as well, the insert 5 is mounted on this opening portion. As a result, the insert 5 fulfills the role of a lid, making it possible to reduce the amount of coolant that is discharged to the outside without flowing from the outflow port 8 of the first flow path 7 at the placement portion 11 into the recessed portion 13.

Further, while the second flow path 39 is formed by the surface of the placement portion 11 and the groove portion 41 formed on the surface of the insert 5 in the first embodiment, the cutting tool 1 of the present embodiment does not include the second flow path 39. As a result, formation of the groove portion 41 on the surface of the insert 5 is not required. Thus, the degree of freedom of the shape of the insert 5 can be increased.

In addition, because the coolant that has flowed from the first flow path 7 can be directly ejected toward the recessed portion 13a, the recessed portion 13a no longer needs to be largely formed to an excessive degree. As a result, the thickness of the holder 3 between the plurality of pockets 9 is more easily ensured, making it possible to increase the durability of the holder 3. In the present embodiment, an inner diameter D1 of the first flow path 7 is same as an inner diameter D2 of the recessed portion 13a.

Note that the inner diameter D1 of the first flow path 7 and the inner diameter D2 of the recessed portion 13a herein each refer to the width in the direction orthogonal to the direction in which the coolant flows. Further, the inner diameters being the same does not mean that the inner diameter D1 and the inner diameter D2 are strictly the same, allowing the inner diameter D2 to have a variance of about ±10% with respect to the inner diameter D1.

In the present embodiment, similar to the recessed portion 13a of the first embodiment, the recessed portion 13a includes: the first portion 43 (bottom surface) having a recessed curved surface shape; and the second portion 45 having a cylindrical shape that extends from the first portion 43 toward the outer periphery of the holder 3. Then, the coolant is ejected toward the first portion 43 of the recessed portion 13a.

Figure 18:
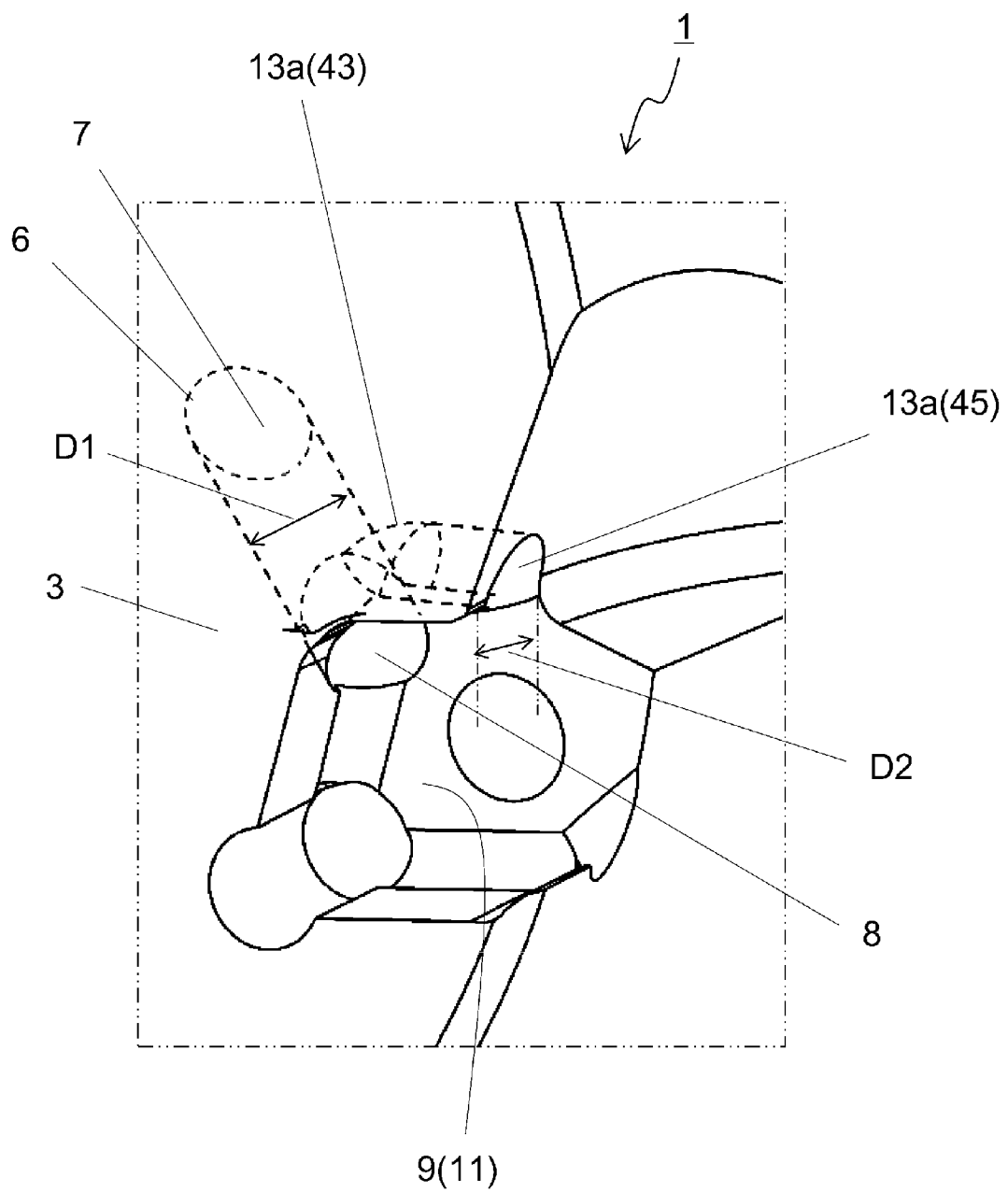
FIG. 18 is an enlarged view of a front tip section of a holder of the second embodiment.

The second portion 45 of the present embodiment opens rearward in the rotational direction X1. The width in the direction orthogonal to the direction in which the coolant flows of this portion of the second portion 45 that opens rearward in the rotational direction X1 is assessed as the above-described inner diameter D2, as illustrated in FIG. 18.

The second portion 45 of the recessed portion 13a of the present embodiment extends from the first portion 43 toward the outer periphery of the holder 3. Then, when viewed from the front tip, the second portion 45 extends so as to come closer to the insert 5 toward the outer periphery of the holder 3.

Specifically, a gap between the insert 5 and a second virtual line L2 indicating the portion of the second portion 45 positioned forward in the rotational direction X1 generally becomes smaller from the inner periphery toward the outer periphery of the holder 3. When the second portion 45 is thus formed, the coolant that flows through the second portion 45 can be more reliably sprayed toward the insert 5.

In the above, although the cutting tools 1 and the inserts 5 of some embodiments are described in detail with reference to the drawings, the cutting tools and the inserts of the present invention are not limited to the configurations of the above-mentioned embodiments.

Next, description will be given of a method for manufacturing a machined product of one embodiment using drawings.

The machined product is produced by carrying out machining on the workpiece. The method for manufacturing a machined product in the present embodiment includes the following steps. Specifically, included are the steps of:

(1) rotating the cutting tool 1 exemplified by the above-mentioned embodiment;

(2) bringing the cutting tool 1 that is rotating into contact with the workpiece 101; and (3) separating the cutting tool 1 from the workpiece 101. Note that, while the manufacturing method of the present embodiment is described using the cutting tool 1 of the first embodiment, the cutting tool 1 of the second embodiment as the cutting tool can work well.

Figure 23:
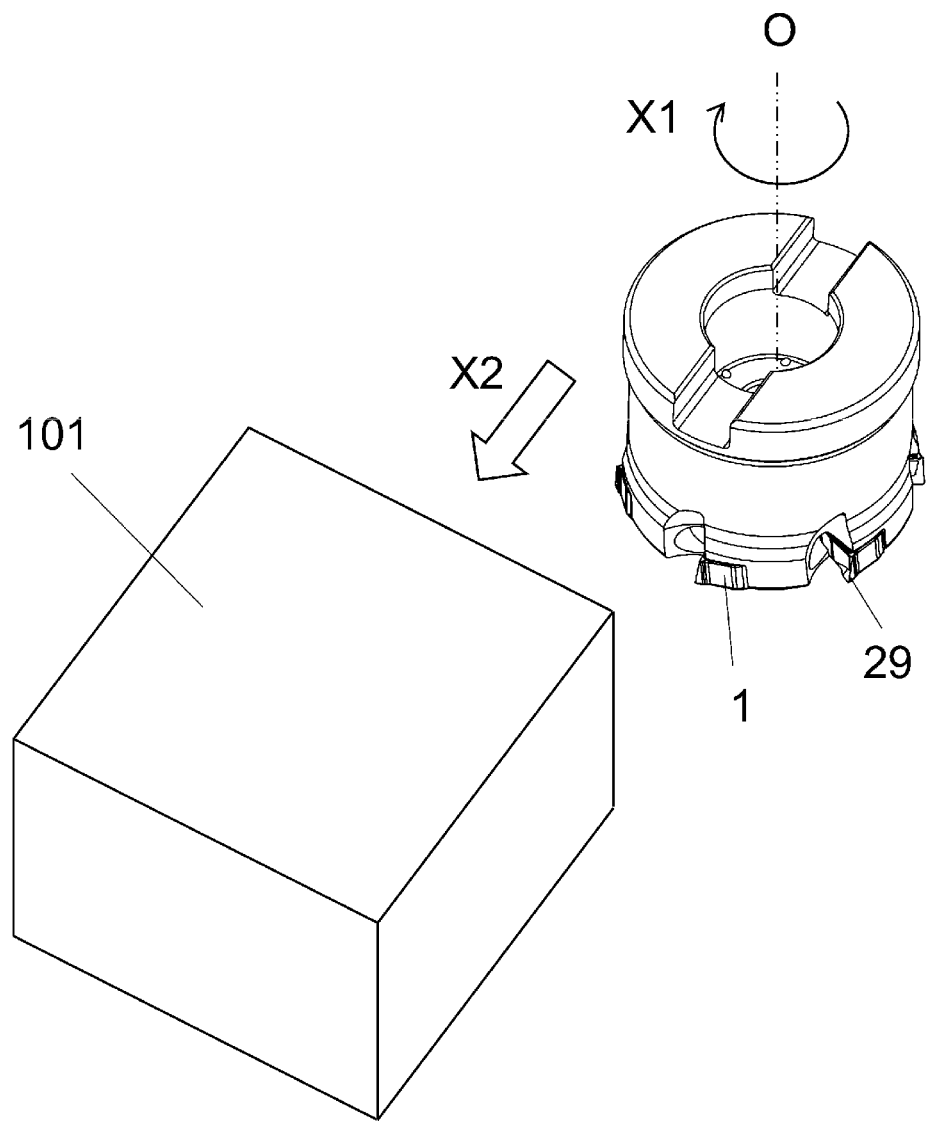
FIG. 23 is a schematic view illustrating one step of a method for manufacturing a machined product of one embodiment.
Figure 24:
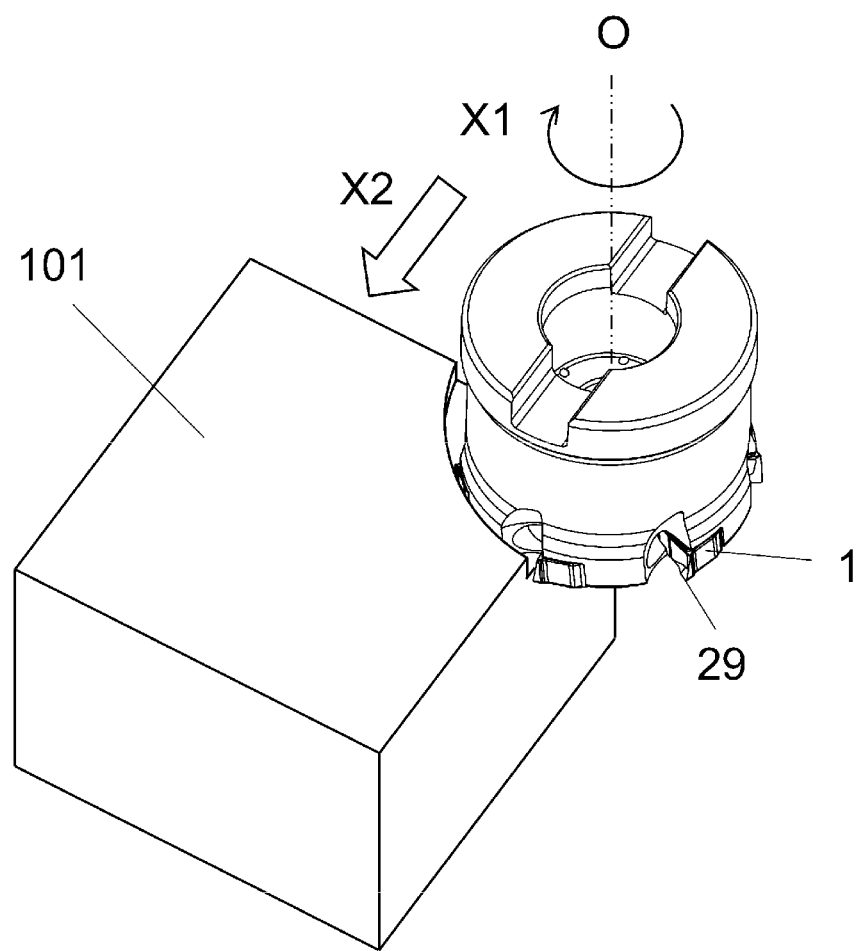
FIG. 24 is a schematic view illustrating one step of the method for manufacturing a machined product of one embodiment.
Figure 25:
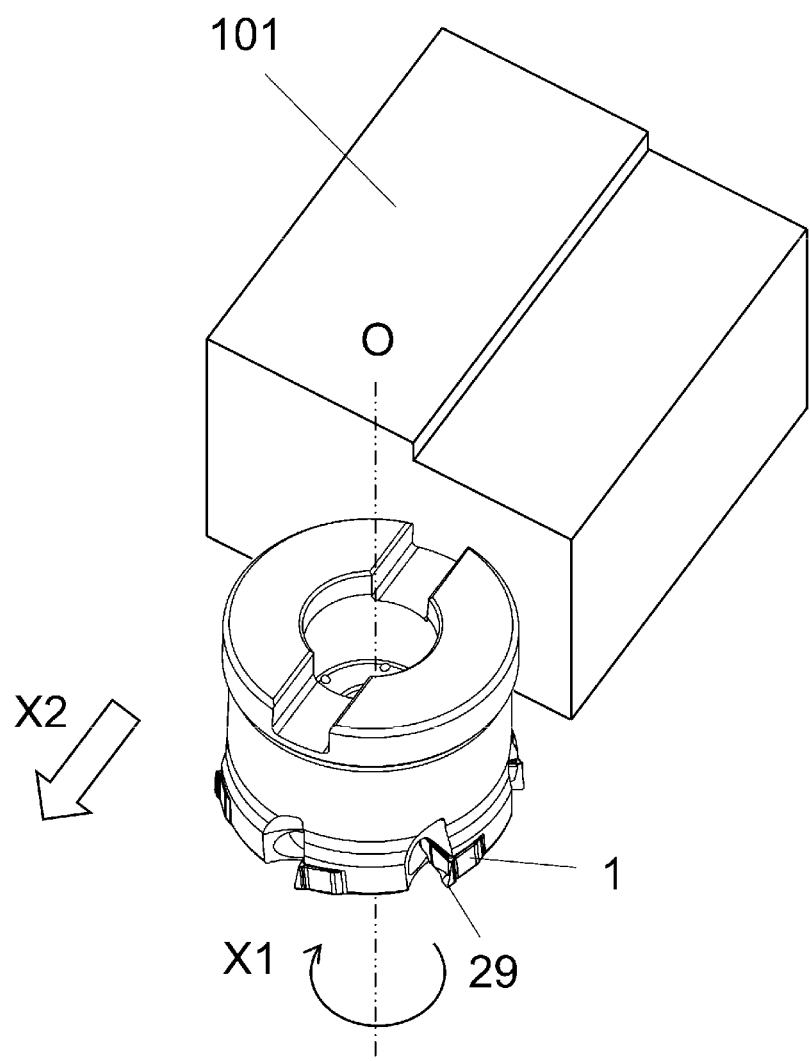
FIG. 25 is a schematic view illustrating one step of the method for manufacturing a machined product of one embodiment.

More specifically, firstly, as illustrated in FIG. 23, the cutting tool 1 is made to rotate about the rotational axis O and move in an X2 direction, bringing the cutting tool 1 relatively close to the workpiece 101. Next, the cutting edge 29 of the cutting tool 1 is brought into contact with the workpiece 101, and the workpiece 101 is cut. In the present embodiment as illustrated in FIG. 24, as the cutting edge 29, the front tip cutting edge and the outer periphery cutting edge of the insert are being made to come into contact with the workpiece 101. Then, as illustrated in FIG. 25, the cutting tool 1 is relatively moved away from the workpiece 101 by moving the cutting tool 1 in the X2 direction.

In the present embodiment, the cutting tool 1 is brought close to the workpiece 101 while the workpiece 101 is fixed and the cutting tool 1 is rotating about the rotational axis O. Further, in FIG. 24, the workpiece 101 is cut by making the front tip cutting edge and the outer periphery cutting edge of the insert that is rotating come into contact with the workpiece 101. Further, in FIG. 25, the cutting tool 1 that is rotating is being moved away from the workpiece 101.

In the machining of the manufacturing method of the present embodiment, in each of the respective steps, although the cutting tool 1 is brought into contact with or separated from the workpiece 101 by moving the cutting tool 1, the present embodiment is of course not limited to such a mode.

For example, in step (1), the workpiece 101 may be brought close to the cutting tool 1. In the same manner, in step (3), the workpiece 101 may be moved away from the cutting tool 1. When the machining is to be continued, steps of bringing the cutting edge 29 of the insert into contact with different positions on the workpiece 101 may be repeated while maintaining the cutting tool 1 rotating.

Here, representative examples of the material of the workpiece 101 include aluminum, carbon steel, alloy steel, stainless steel, cast iron, non-ferrous metals, or the like.

REFERENCE SIGNS LIST

1 Cutting tool
3 Holder
5 Insert
6 Inflow port
7 Flow path
8 Outflow port
9 Pocket
11 Placement portion
13 Cutout portion
13a Recessed portion
15 Screw
17 Upper surface
19 Lower surface
21 Front side surface
23 Rear side surface
25 Outer side surface
27 Inner side surface
29 Cutting edge
31 Outer periphery cutting edge
33 Front tip cutting edge
35 Through-hole
37 First flow path
39 Second flow path
40 Third flow path
41 Groove portion
43 First portion
45 Second portion
101 Workpiece

What is claimed is:

1. A cutting tool comprising:
an insert comprising:
a first surface,
a second surface, and
a cutting edge located at an intersection of the first surface and the second surface; and
a holder extending from a front tip to a rear tip and being capable of rotating about a rotational axis, and comprising:
a pocket comprising:
a placement portion where the insert is positioned; and
a recessed portion positioned further forward in the rotational direction than the placement portion;
a first inflow port that opens within the holder;
an outflow port positioned at the pocket,
a first flow path positioned in the interior of the holder and extending from the first inflow port to the outflow port; and
a second flow path extending from the outflow port to the recessed portion, wherein a direction of the second flow path intersects the recessed portion,
wherein
the recessed portion comprises:
a first portion having a curved surface shape positioned at an inner side of the holder, and
a second portion having a cylindrical shape positioned outside of the first portion.

2. The cutting tool according to claim 1, wherein
the recessed portion is at least partially positioned on a first virtual line that connects the rotational axis and the cutting edge when viewed from the front tip.

3. The cutting tool according to claim 1, wherein
the insert further comprises a surface, the surface:
facing the placement portion; and
comprising a groove portion; and
the groove portion constitutes a portion of the second flow path.

4. The cutting tool according to claim 1, wherein
the second portion is inclined rearward in the rotational direction from an end portion positioned at an inner side of the holder toward an end portion positioned at an outer side of the holder, in a transparent view from the front tip.

5. A method for manufacturing a machined product, the method comprising the steps of:
rotating the cutting tool according to claim 1;
bringing the cutting tool that is rotating into contact with a workpiece; and
separating the cutting tool from the workpiece.

6. The cutting tool according to claim 1, wherein
the recessed portion opens toward a reverse direction of the rotational direction and is closed at the front tip of the holder.

7. A cutting tool comprising:
an insert comprising:
a first surface,
a second surface,
a cutting edge located at an intersection of the first surface and the second surface, and
a third surface; and
a holder configured to rotate about a rotational axis, the holder comprising:
a pocket comprising:
a placement portion where the insert is positioned, and
a recessed portion of the holder adjacent to the placement portion;
a fluid path configured to supply fluid to the insert, the fluid path comprising:
a first flow path comprising an inflow part located within the holder and directed at the insert,
a second flow path connected to the first flow path and directed along the third surface of the insert, and
the recessed portion connected to the second flow path and directed at the first surface and the cutting edge of the insert,
wherein
the recessed portion is configured to collect fluid flowing from the first flow path through the second flow path and direct flow of the fluid collected in the recessed portion to the first surface and the cutting edge of the insert via rotation of the holder and the recessed portion comprises an opening with a near end of the opening adjacent to the first surface of the insert and closer to the rotational axis of the holder than a distal end of the opening.

8. The cutting tool according to claim 7, wherein
the second flow path is formed by a surface of the holder and a groove in the third surface of the insert.

9. The cutting tool according to claim 7, wherein
a cross-sectional area of the second flow path is smaller than a cross-sectional area of the first flow path.

10. The cutting tool according to claim 7, wherein
the recessed portion comprises a curved surface shape section where the second flow path connects to the recessed portion.

11. The cutting tool according to claim 10, wherein
the recessed portion further comprises a cylindrical shape section extending away from the curved surface shape section.

12. A cutting tool comprising:
an insert comprising:
   a first surface,
   a second surface, and
   a cutting edge located at an intersection of the first surface and the second surface; and
a holder extending from a front tip to a rear tip and being capable of rotating about a rotational axis, and comprising:
   a pocket comprising:
      a placement portion where the insert is positioned; and
      a recessed portion positioned further forward in the rotational direction than the placement portion;
   a first inflow port that opens within the holder;
   an outflow port positioned at the pocket,
   a first flow path positioned in the interior of the holder and extending from the first inflow port to the outflow port; and
   a second flow path extending from the outflow port to the recessed portion, wherein a direction of the second flow path intersects the recessed portion,
wherein
the recessed portion opens toward a reverse direction of the rotational direction and is closed at the front tip of the holder.

13. The cutting tool according to claim 12, wherein
the recessed portion is at least partially positioned on a first virtual line that connects the rotational axis and the cutting edge when viewed from the front tip.

14. The cutting tool according to claim 12, wherein
the insert further comprises a surface, the surface:
   facing the placement portion; and
   comprising a groove portion; and
   the groove portion constitutes a portion of the second flow path.

15. The cutting tool according to claim 12, wherein
the recessed portion comprises a first portion having a curved surface shape positioned at an inner side of the holder.

16. The cutting tool according to claim 15, wherein
the recessed portion further comprises a second portion having a cylindrical shape positioned outside of the first portion.

17. The cutting tool according to claim 16, wherein
the second portion is inclined rearward in the rotational direction from an end portion positioned at an inner side of the holder toward an end portion positioned at an outer side of the holder, in a transparent view from the front tip.

18. A method for manufacturing a machined product, the method comprising the steps of:
rotating the cutting tool according to claim 12;
bringing the cutting tool that is rotating into contact with a workpiece; and
separating the cutting tool from the workpiece.

* * * * *